(12) United States Patent
Edmiston et al.

(10) Patent No.: US 12,496,061 B2
(45) Date of Patent: Dec. 16, 2025

(54) MINIMALLY INVASIVE HEART VALVE REPAIR IN A BEATING HEART

(71) Applicant: NeoChord, Inc., St. Louis Park, MN (US)

(72) Inventors: Daryl Edmiston, Draper, UT (US); Dan Johnson, Minneapolis, MN (US); Max Bock-Aronson, Minneapolis, MN (US); Tyler Nordmann, Maple Grove, MN (US)

(73) Assignee: NeoChord, Inc., Maple Grove, MN (US)

( * ) Notice: Subject to any disclaimer, the term of this patent is extended or adjusted under 35 U.S.C. 154(b) by 472 days.

(21) Appl. No.: 17/579,827

(22) Filed: Jan. 20, 2022

(65) Prior Publication Data
US 2022/0225979 A1    Jul. 21, 2022

Related U.S. Application Data

(60) Provisional application No. 63/140,198, filed on Jan. 21, 2021.

(51) Int. Cl.
*A61B 17/04* (2006.01)
*A61B 17/00* (2006.01)
*A61F 2/24* (2006.01)

(52) U.S. Cl.
CPC ...... *A61B 17/0487* (2013.01); *A61B 17/0469* (2013.01); *A61B 2017/00243* (2013.01);
(Continued)

(58) Field of Classification Search
CPC .. A61B 2017/00663; A61B 2017/0406; A61B 2017/048; A61B 2017/0474;
(Continued)

(56) References Cited

U.S. PATENT DOCUMENTS 3,628,221 A * 12/1971 Pasbrig ............... F16B 2/08
439/783
4,406,440 A * 9/1983 Kulle .................. A61M 39/286
251/6

(Continued)

FOREIGN PATENT DOCUMENTS

DE    19845817 A1    4/2000
WO    2019222213 A2  11/2019

OTHER PUBLICATIONS

International Search Report, Application No. PCT/US22/13069, Dated Apr. 11, 2022.
(Continued)

*Primary Examiner* — Darwin P Erezo
*Assistant Examiner* — Mitchell Brian Hoag
(74) *Attorney, Agent, or Firm* — Merchant & Gould P.C.

(57) ABSTRACT

Disclosed herein are minimally invasive systems and methods for performing an edge to edge repair of a heart valve on a beating heart of a patient. One or more sutures are inserted into a plurality of leaflets of the heart valve while the heart is beating through a minimally invasive access. The sutures can be threaded through a suture crimp that is advanced to the leaflets. A movable gate on the suture crimp can be actuated to secure the sutures at an appropriate tension to maintain the leaflets in a coapted position.

11 Claims, 24 Drawing Sheets

(52) U.S. Cl.
CPC .............. *A61B 2017/00663* (2013.01); *A61B 2017/00893* (2013.01); *A61B 2017/0406* (2013.01); *A61B 2017/0474* (2013.01); *A61B 2017/048* (2013.01); *A61B 2017/0488* (2013.01); *A61B 2017/0496* (2013.01); *A61F 2/246* (2013.01); *A61F 2/2463* (2013.01); *A61F 2/2466* (2013.01)

(58) Field of Classification Search
CPC ........ A61B 17/0487; A61B 2017/0488; A61B 2017/0495; A61B 2017/0496; A61B 2017/0454; A61B 2017/0414; A61B 2017/0448; A61B 2017/045; A61B 2017/0451; A61B 2017/0453; A61B 17/0401; A61F 2/246; A61F 2/2463; A61F 2/2466; A61F 2/2478; A61F 2/2481; A61F 2002/2484; A61F 2/2487; A61F 2002/249
USPC ......................................................... 606/139
See application file for complete search history.

(56) References Cited

U.S. PATENT DOCUMENTS

| | | | | |
|---|---|---|---|---|
| 5,137,517 | A * | 8/1992 | Loney | A61M 25/09041 606/1 |
| 5,320,632 | A * | 6/1994 | Heidmueller | A61B 17/0469 112/169 |
| 5,423,860 | A * | 6/1995 | Lizardi | A61B 50/30 606/232 |
| 5,514,159 | A | 5/1996 | Matula | |
| 5,899,921 | A * | 5/1999 | Caspari | A61B 17/0487 606/232 |
| 6,814,724 | B2 * | 11/2004 | Taylor | B01F 35/7179 210/323.1 |
| 8,323,315 | B2 * | 12/2012 | Schwartz | A61B 17/0401 606/232 |
| 8,465,500 | B2 | 6/2013 | Speziali | |
| 9,119,614 | B2 * | 9/2015 | Gadladge | A61B 17/0401 |
| 9,131,939 | B1 * | 9/2015 | Call | A61B 17/0487 |
| 9,216,018 | B2 * | 12/2015 | Sutherland | A61B 17/0469 |
| 9,357,993 | B2 * | 6/2016 | Foerster | A61F 2/0811 |
| 10,112,042 | B2 * | 10/2018 | Journot | A61N 1/00 |
| 10,588,620 | B2 * | 3/2020 | Caffes | A61B 17/00234 |
| 11,065,120 | B2 * | 7/2021 | Cortez, Jr. | A61B 17/0469 |
| 2005/0085855 | A1 * | 4/2005 | Forsberg | A61B 17/0057 606/232 |
| 2006/0106423 | A1 | 5/2006 | Weisel | |
| 2007/0032793 | A1 * | 2/2007 | Del Rio | A61B 17/0401 606/326 |
| 2007/0276437 | A1 * | 11/2007 | Call | A61B 17/0487 606/232 |
| 2009/0069847 | A1 * | 3/2009 | Hashiba | A61B 17/0487 606/232 |
| 2009/0105751 | A1 | 4/2009 | Zentgraf | |
| 2011/0098743 | A1 | 4/2011 | Lyons | |
| 2011/0152607 | A1 | 6/2011 | Catanese | |
| 2011/0152889 | A1 | 6/2011 | Ashland | |
| 2012/0184971 | A1 | 7/2012 | Zentgraf et al. | |
| 2012/0289977 | A1 | 11/2012 | Zarbatany | |
| 2013/0035757 | A1 | 2/2013 | Zentgraf et al. | |
| 2016/0218474 | A1 * | 7/2016 | Tsai | B21D 37/14 |
| 2017/0014122 | A1 | 1/2017 | Lear | |
| 2018/0280138 | A1 * | 10/2018 | Colli | A61B 17/0482 |
| 2019/0029671 | A1 * | 1/2019 | Zhang | A61B 17/0625 |
| 2019/0224012 | A1 * | 7/2019 | Colli | A61B 17/0625 |
| 2019/0261997 | A1 * | 8/2019 | Goldfarb | A61M 25/0138 |
| 2019/0343626 | A1 | 11/2019 | Smirnov et al. | |
| 2019/0343634 | A1 | 11/2019 | Garvin et al. | |
| 2020/0222186 | A1 | 7/2020 | Edmiston et al. | |
| 2020/0368022 | A1 * | 11/2020 | Zentgraf | A61B 17/0057 |
| 2021/0282764 | A1 | 9/2021 | Caffes et al. | |
| 2022/0039955 | A1 | 2/2022 | Colli | |
| 2022/0313437 | A1 | 10/2022 | Anderson et al. | |
| 2023/0157350 | A1 | 5/2023 | Yanez et al. | |
| 2023/0270432 | A1 | 8/2023 | Caffes et al. | |
| 2023/0363908 | A1 * | 11/2023 | Freeman | A61F 2/2466 |
| 2024/0252317 | A1 | 8/2024 | Garvin et al. | |
| 2024/0293231 | A1 | 9/2024 | Edmiston et al. | |

OTHER PUBLICATIONS

Extended European Search Report, dated Mar. 10, 2025, Application No. PCT/US2022/013069.

* cited by examiner

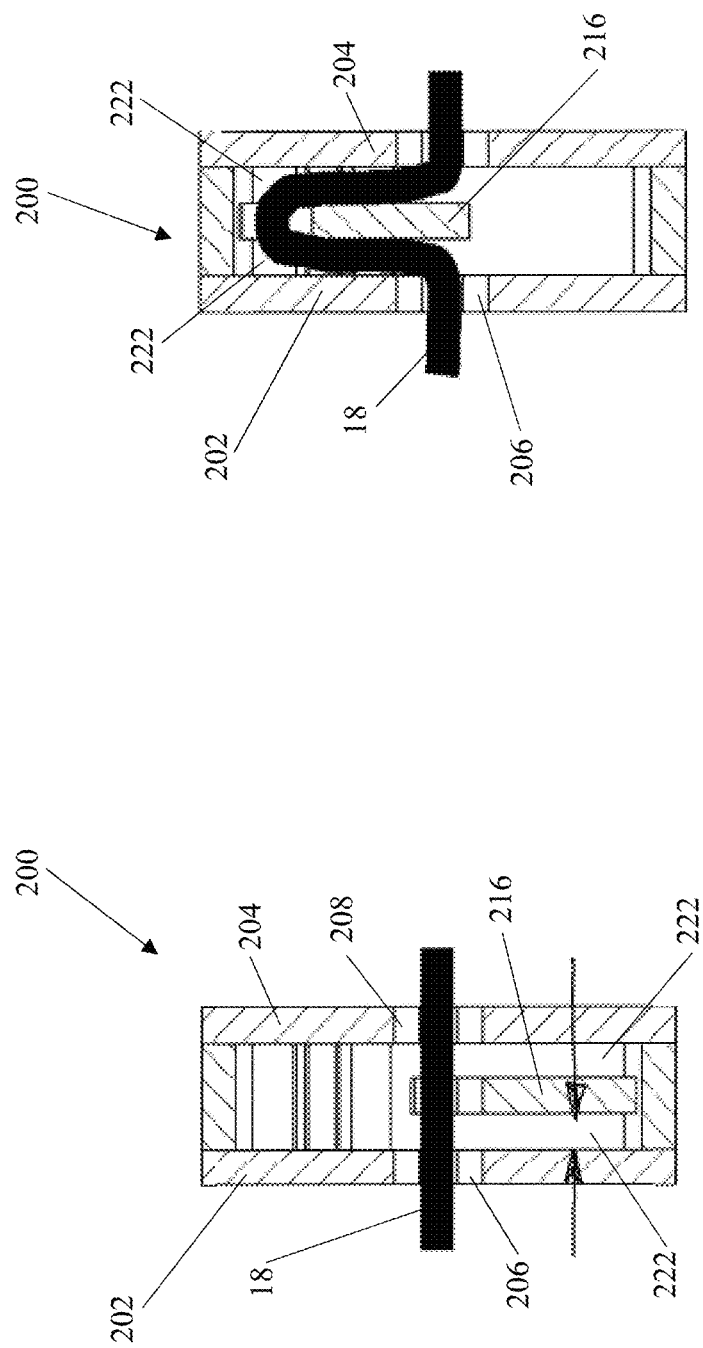

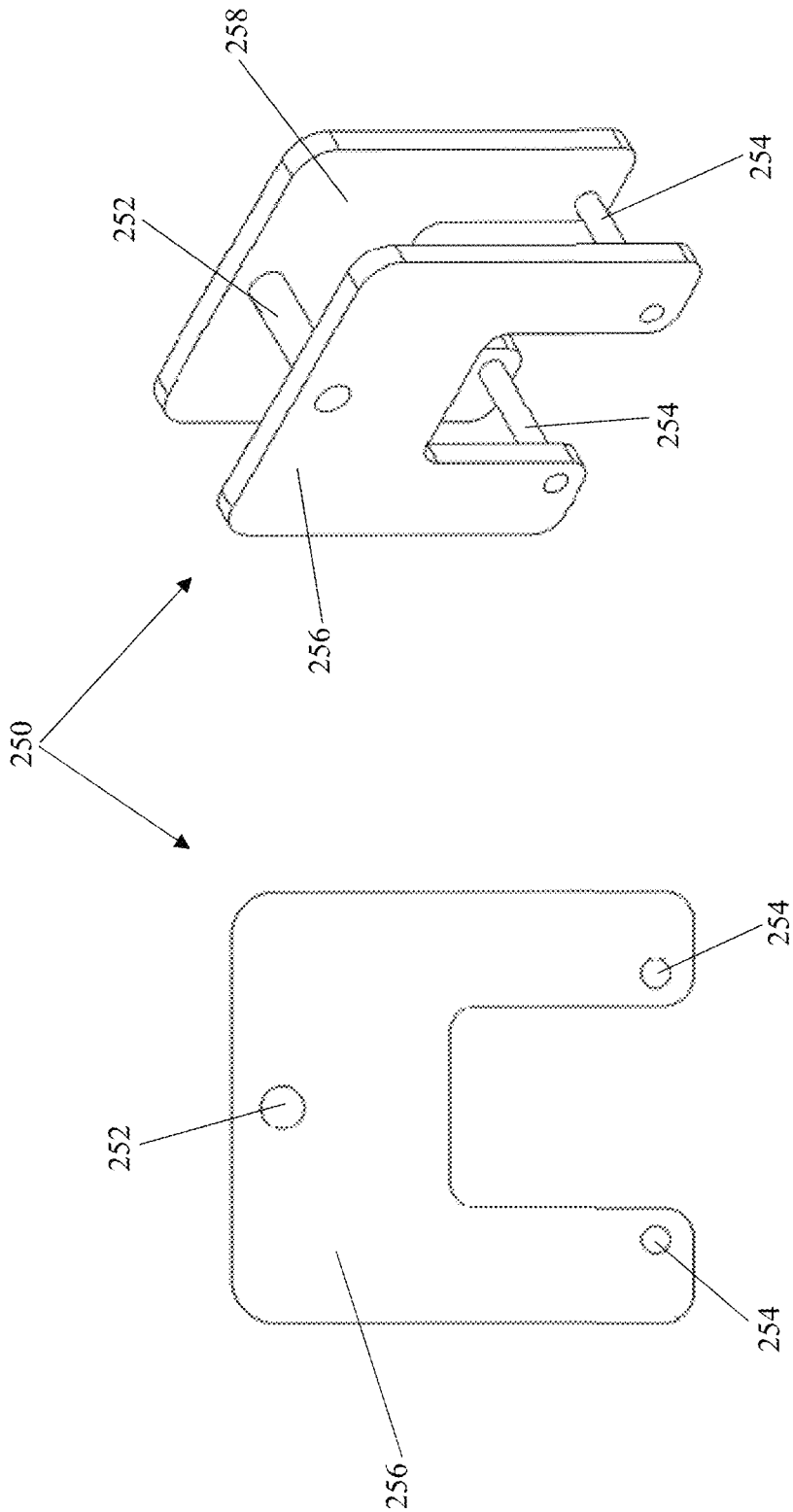

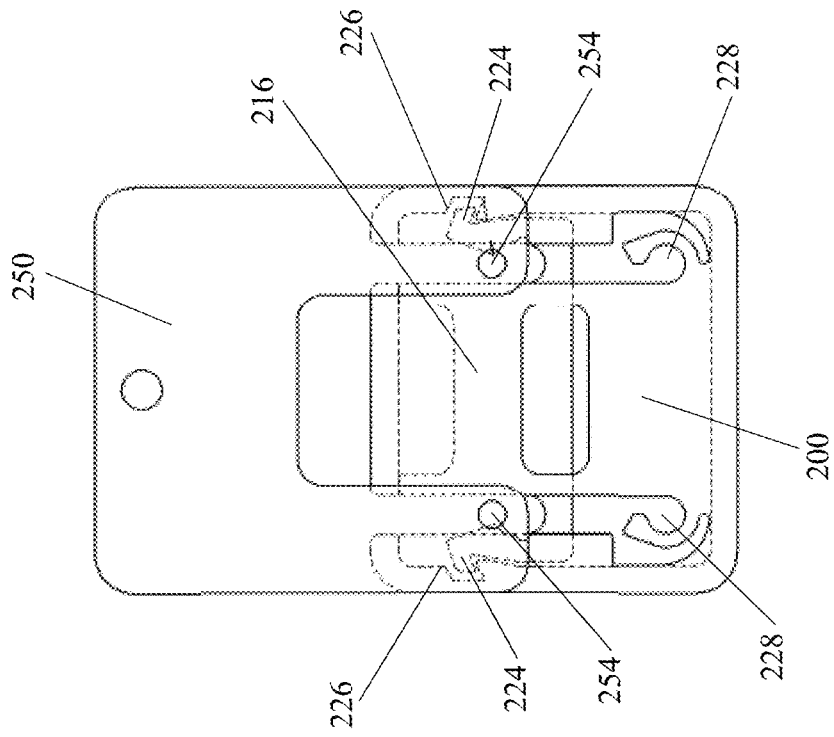
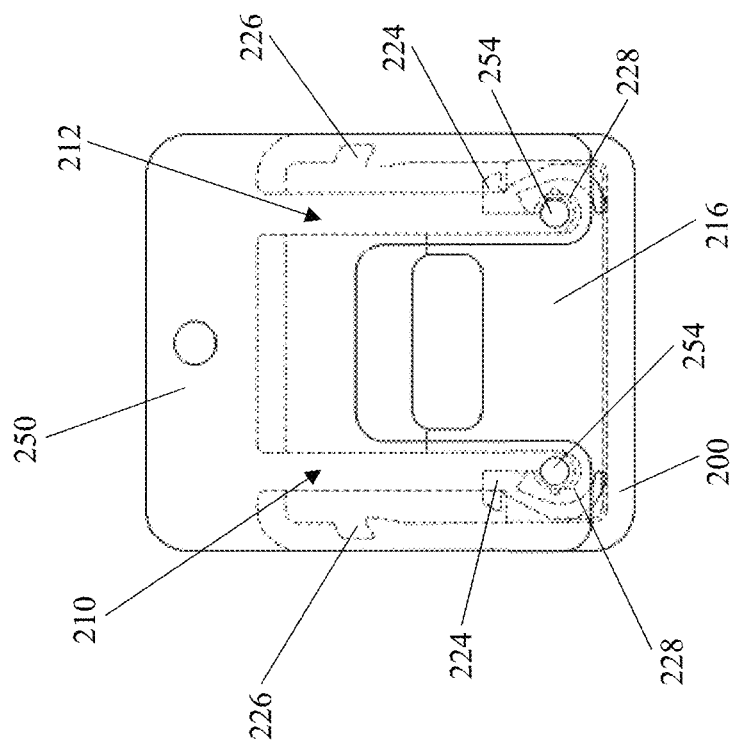
*Fig. 7A*
*Fig. 7B*

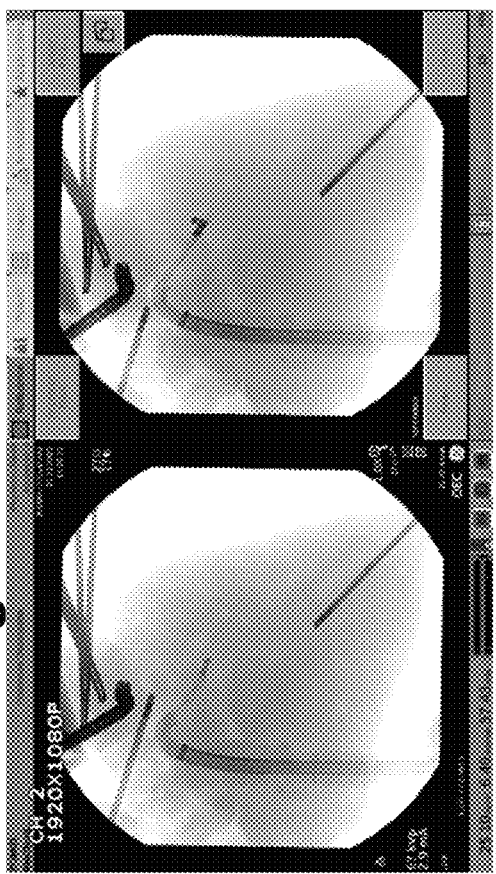
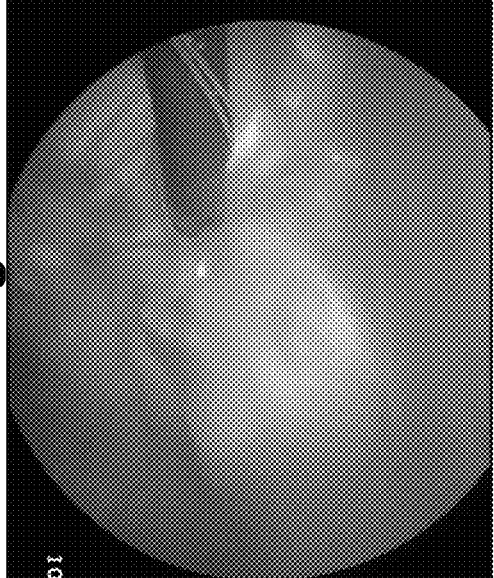
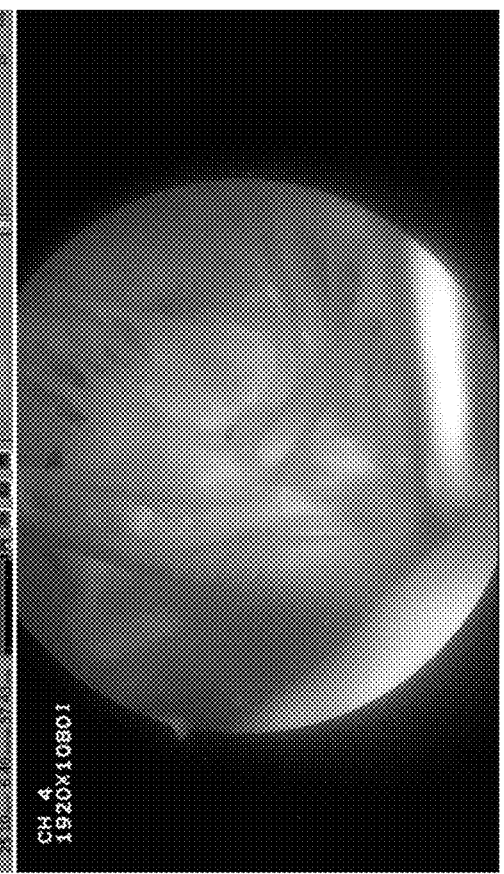
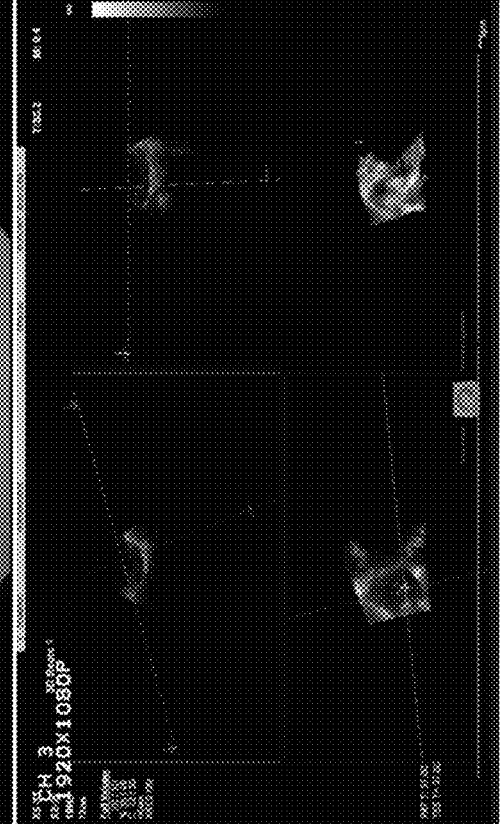
Fig. 22A
Fig. 22B
Fig. 22C
Fig. 22D

MINIMALLY INVASIVE HEART VALVE REPAIR IN A BEATING HEART

RELATED APPLICATION

This application claims the benefit of U.S. Provisional Application No. 63/140,198 filed Jan. 21, 2021, which is hereby fully incorporated herein by reference.

TECHNICAL FIELD

The present disclosure relates to minimally invasive repair of a heart valve while the patient's heart is beating. More particularly, embodiments of the present disclosure relate to minimally invasive systems and methods for performing an edge to edge heart valve leaflet repair on a beating heart.

BACKGROUND OF THE INVENTION

Various types of surgical procedures are currently performed to investigate, diagnose, and treat diseases of the heart and the great vessels of the thorax. Such procedures include repair and replacement of mitral, aortic, and other heart valves, repair of atrial and ventricular septal defects, pulmonary thrombectomy, treatment of aneurysms, electrophysiological mapping and ablation of the myocardium, and other procedures in which interventional devices are introduced into the interior of the heart or a great vessel.

Of particular interest are intracardiac procedures for surgical treatment of heart valves, especially the mitral and aortic valves. Tens of thousands of patients are diagnosed with aortic and mitral valve disease each year. Various surgical techniques may be used to repair a diseased or damaged valve, including annuloplasty (contracting the valve annulus), quadrangular resection (narrowing the valve leaflets), commissurotomy (cutting the valve commissures to separate the valve leaflets), shortening mitral or tricuspid valve chordae tendonae, reattachment of severed mitral or tricuspid valve chordae tendonae or papillary muscle tissue, and decalcification of valve and annulus tissue. Alternatively, the valve may be replaced by excising the valve leaflets of the natural valve and securing a replacement valve in the valve position, usually by suturing the replacement valve to the natural valve annulus. Valve replacement, however, can present a number of difficulties including that the invasiveness of the procedure can lead to long recovery times and that the irregular shape of the valve annulus can cause difficulty in properly fixing and orienting the replacement valve, which can lead to leaks and other problems. Therefore, in situations where patients can adequately be treating by repairing, rather than replacing, the valve, it is generally preferable to do so.

The mitral and tricuspid valves inside the human heart include an orifice (annulus), two (for the mitral) or three (for the tricuspid) leaflets and a subvalvular apparatus. The subvalvular apparatus includes multiple chordae tendineae, which connect the mobile valve leaflets to muscular structures (papillary muscles) inside the ventricles. Rupture or elongation of the chordae tendineae results in partial or generalized leaflet prolapse, which causes mitral (or tricuspid) valve regurgitation. A commonly used technique to surgically correct mitral valve regurgitation is the implantation of artificial chordae (usually 4-0 or 5-0 Gore-Tex sutures) between the prolapsing segment of the valve and the papillary muscle. This traditionally open-heart operation was generally carried out through a median sternotomy and required cardiopulmonary bypass with aortic cross-clamp and cardioplegic arrest of the heart, as described above.

Using such open heart techniques, the large opening provided by a median sternotomy or right thoracotomy enables the surgeon to see the mitral valve directly through the left atriotomy, and to position his or her hands within the thoracic cavity in close proximity to the exterior of the heart for manipulation of surgical instruments, removal of excised tissue, and/or introduction of a replacement valve through the atriotomy for attachment within the heart. However, these invasive open-heart procedures produce a high degree of trauma, a significant risk of complications, an extended hospital stay, and a painful recovery period for the patient. Moreover, while heart valve surgery produces beneficial results for many patients, numerous others who might benefit from such surgery are unable or unwilling to undergo the trauma and risks of current techniques.

Techniques have been developed and are under development for minimally invasive thorascopic repair of heart valves while the heart is still beating. Int'l Pub. No. WO 2006/078694 A2 to Speziali discloses a thorascopic heart valve repair method and apparatus. Instead of requiring open heart surgery on a stopped heart, the thorascopic heart valve repair methods and apparatus taught by Speziali utilize fiber optic technology in conjunction with transesophageal echocardiography (TEE) as a visualization technique during a minimally invasive surgical procedure that can be utilized on a beating heart. More recent versions of these techniques are disclosed in U.S. Patent Application Publication Nos. 2009/0105751 and 2009/0105729 to Zentgraf, which disclose an integrated device that can enter the heart chamber, navigate to the leaflet, capture the leaflet, confirm proper capture, and deliver a suture as part of a mitral valve regurgitation (MR) repair. These references are hereby incorporated by reference herein in their entirety.

An alternative to the above-described techniques that insert a suture through a single valve leaflet and anchor the suture to the heart is an edge to edge valve repair. In a traditional Alfieri edge to edge procedure, the edges of adjacent valve leaflets are sutured together to coapt the leaflets using an open surgical approach. This technique has been mimicked in minimally invasive, beating heart procedures by employing a clip that joins the leaflets together rather than a suture. U.S. Patent Publication No. 2004/0044365 to Bachman discloses a technique for minimally invasively accessing the heart through an endovascular approach to perform an edge to edge repair. There is, however, a need for a technique for performing an edge to edge repair on a beating heart of a patient that secures the leaflets together at a proper tension in a more effective manner.

SUMMARY OF THE INVENTION

Disclosed herein are minimally invasive systems and methods for performing an edge to edge repair of a heart valve on a beating heart of a patient. One or more sutures are inserted into a plurality of leaflets of the heart valve while the heart is beating through a minimally invasive access. The sutures can be threaded through a suture crimp that is advanced to the leaflets. A movable gate on the suture crimp can be actuated to secure the sutures at an appropriate tension to maintain the leaflets in a coapted position.

In an embodiment, a suture crimping system is configured to crimp a suture attached to a heart valve leaflet in a beating heart of a patient. The suture crimp can include a crimp body having an open interior and a pair of locking grooves and a suture clamping gate movable within the crimp body and having a pair of locking tabs corresponding to the locking grooves. The suture crimp can define a loading aperture through the crimp body configured to enable a suture to pass through the crimp body. The system can further include a crimp holder having a first plate and a second plate defining a suture crimp space therebetween configured to releasably contain the suture crimp. The crimp holder can further comprise a pull rod extending between the first plate and the second plate and a pair of lock tab actuators extending between the first plate and the second plate configured to interface with corresponding lock tab actuator apertures in the suture clamping gate of the suture crimp to enable the crimp holder to move the suture clamping gate. When a force is applied proximally on the pull rod of the crimp holder, the crimp holder and the suture clamping gate can move proximally with respect to the crimp body to move the suture clamping gate from an open position in which the suture can slide freely through the loading aperture and a closed position in which the locking tabs of the suture clamping gate interface with the locking grooves in the crimp body to lock the suture clamping gate in the closed position to securely hold a tensioned suture between the suture clamping gate and the crimp body.

A suture crimp configured to crimp a suture attached to a heart valve leaflet in a beating heart of a patient can include a crimp body having an open interior and a pair of locking grooves and further defining a loading aperture through the crimp body configured to enable a suture to pass through the crimp body. A suture clamping gate can be movable within the crimp body and have a pair of locking tabs corresponding to the locking grooves. The suture clamping gate can be configured to move proximally with respect to the crimp body to move the suture clamping gate from an open position in which the suture can slide freely through the loading aperture and a closed position in which the locking tabs of the suture clamping gate interface with the locking grooves in the crimp body to lock the suture clamping gate in the closed position to securely hold a tensioned suture between the suture clamping gate and the crimp body.

In an embodiment, a method of crimping a suture attached to a heart valve leaflet in a beating heart of a patient can include minimally invasively inserting a suture into a heart valve leaflet in a beating heart of a patient such that a pair of free ends of the suture extend from the leaflet out of the body, threading the free ends of the suture through a loading aperture of a crimp body of a suture crimp and delivering the suture crimp along the suture to the leaflet with a delivery catheter. The tension on the suture can then be adjusted to a desired tension. A force can them be applied proximally on a suture clamping gate disposed within the crimp body to move the suture clamping gate proximally with respect to the crimp body from an open position in which the suture can slide freely through the loading aperture and a closed position in which locking tabs of the suture clamping gate interface with locking grooves in the crimp body to lock the suture clamping gate in the closed position to securely hold the suture between the suture clamping gate and the crimp body at the desired tension.

In an embodiment, a method of crimping a suture attached to a heart valve leaflet in a beating heart of a patient can include minimally invasively inserting a suture into a heart valve leaflet in a beating heart of a patient such that a pair of free ends of the suture extending from the leaflet out of the body, threading the free ends of the suture through a loading aperture of a crimp body of a suture crimp and delivering the suture crimp and a crimp holder releasably connected to the suture crimp along the suture to the leaflet with a delivery catheter. A tension on the suture can then be adjusted to a desired tension. A proximal force can then be applied on a pull rod of the crimp holder to cause the crimp holder and the suture clamping gate to move proximally with respect to the crimp body to move the suture clamping gate from an open position in which the suture can slide freely through the loading aperture and a closed position in which locking tabs of the suture clamping gate interface with locking grooves in the crimp body to lock the suture clamping gate in the closed position to securely hold the suture between the suture clamping gate and the crimp body at the desired tension.

BRIEF DESCRIPTION OF THE DRAWINGS

The invention may be more completely understood in consideration of the following detailed description of various embodiments of the invention in connection with the accompanying drawings, in which:

FIG. 3A is a section view of a suture with an open suture crimp according to an embodiment.

FIG. 3B is section view of a suture with the suture crimp of FIG. 3A in a closed position.

FIG. 5A is a plan view of crimp holder according to an embodiment.

FIG. 5B is an isometric view of the crimp holder of FIG. 5A.

FIG. 7A is a plan view of the suture crimp and crimp holder of FIG. 6 in an open position.

FIG. 7B is a plan view of the suture crimp and crimp holder of FIG. 6 in a closed position.

FIGS. 18A-8F depict detailed isometric view of a suture being deployed into a heart valve leaflet according to embodiments of the disclosure.

FIGS. 22A-22D are endoscopic images depicting a suture crimp having been delivered along the sutures of FIGS. 21A-22D to the leaflets.

Figures 1A, 1B:
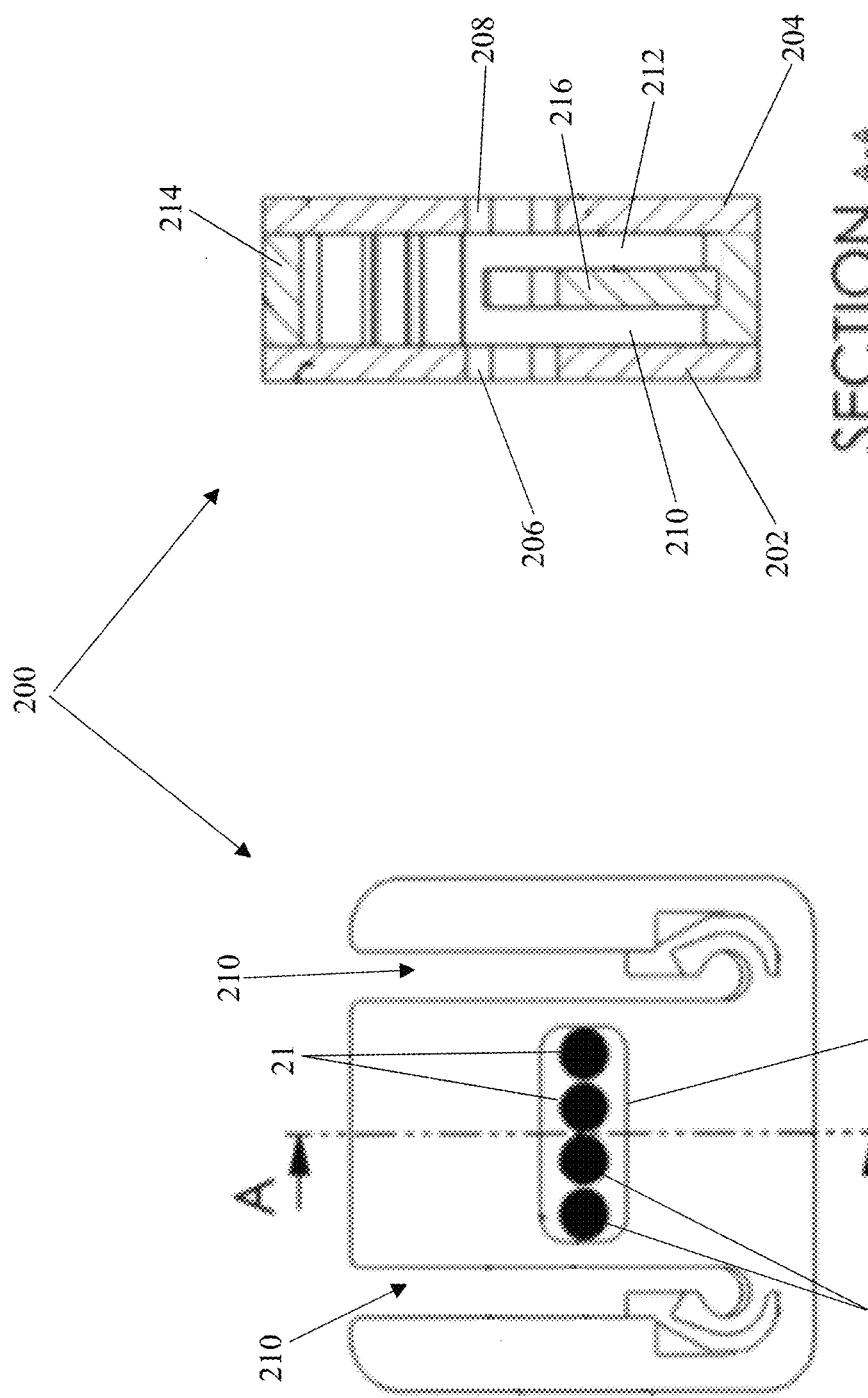
FIG. 1A is a plan view of a suture crimp according to an embodiment.
FIG. 1B is a section view of the suture crimp of FIG. 1A.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

A mitral valve is schematically depicted in FIGS. 11-13B. Situated between the left atrium and left ventricle, the mitral valve consists of two flaps of tissue, or leaflets (a posterior leaflet and an anterior leaflet). The mitral valve annulus forms a ring around the valve leaflets, thereby connecting the leaflets to the heart muscle. Papillary muscles are located at the base of the left ventricle. Tendon-like cords called chordae tendineae anchor the mitral valve leaflets to the papillary muscles. Normal chordae tendineae prevent the leaflets from prolapsing, or inverting, into the left atrium, as depicted in FIG. 13A.

Figure 13A:
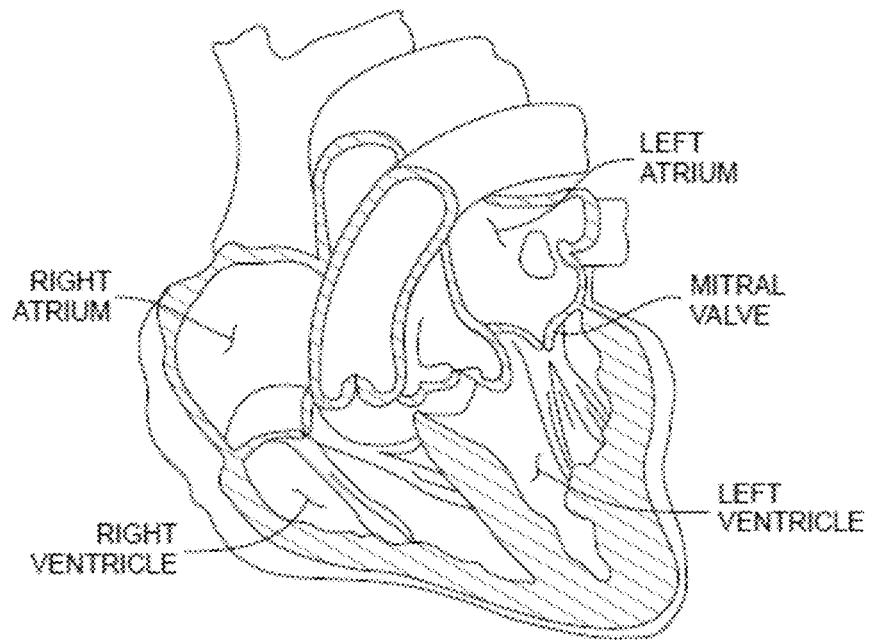
FIG. 13A is a schematic cross-sectional view of a heart with a normal mitral valve.
Figure 13B:
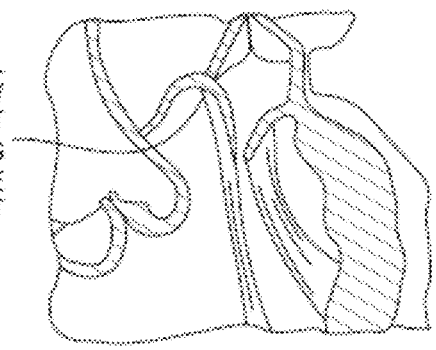
FIG. 13B is a partial schematic cross-sectional view of a heart with an abnormal mitral valve.

A properly functioning mitral valve opens and closes fully. When the mitral valve fails to fully close, as depicted in FIG. 13B, blood from the left ventricle is able to flow backward into the left atrium instead of flowing forward into the aorta. This backflow of blood through the heart valve is called regurgitation. The regurgitation of blood through the heart due to the failure of the mitral valve to close properly (coapt) is the condition known as mitral valve regurgitation (MR). A common symptom of mitral valve regurgitation is congestion of blood within the lungs. If left untreated, severe MR can eventually lead to serious cardiac arrhythmia and/or congestive heart failure (CHF).

Mitral valve regurgitation can be caused by any number of conditions, including mitral valve prolapse (a condition in which the leaflets and chordae tendineae of the mitral valve are weakened resulting in prolapse of the valve leaflets, improper closure of the mitral valve, and the backflow of blood within the heart with each contraction of the left ventricle), damaged chords (wherein the chordae tendineae become stretched or ruptured, causing substantial leakage through the mitral valve), ventricular enlargement, rheumatic fever (the infection can cause the valve leaflets to thicken, limiting the valve's ability to open, or cause scarring of the leaflets, leading to regurgitation), endocarditis (an infection inside the heart), deterioration of the mitral valve with age, prior heart attack (causing damage to the area of the heart muscle that supports the mitral valve), and a variety of congenital heart defects. As MR becomes exacerbated over time, the condition can become more severe, resulting in life-threatening complications, including atrial fibrillation (an irregular heart rhythm in which the atria beat chaotically and rapidly, causing blood clots to develop and break loose and potentially result in a stroke), heart arrhythmias, and congestive heart failure (occurring when the heart becomes unable to pump sufficient blood to meet the body's needs due to the strain on the right side of the heart caused by fluid and pressure build-up in the lungs).

The present application describes various devices and methods that can be employed on the beating heart of a patient in a minimally invasive manner to treat mitral valve regurgitation as described above. Embodiments as described herein can be used to restrain a prolapsing leaflet to prevent leaflet prolapse and to promote leaflet coaptation. Specifically, the disclosed embodiments can provide a minimally invasive edge to edge treatment of MR. This treatment significantly decreases trauma to surgical patients by facilitating transapical access of a beating heart via a lateral thoracotomy in a manner that eliminates certain surgical steps normally required to complete mitral valve repair procedure by sternotomy.

In certain embodiments, the methods and apparatus described herein can be performed or configured for edge to edge leaflet repair via transapical access. Transapical access to a heart includes all entry points that are within approximately the bottom third of the heart. As used in this patent application, transapical access to a heart includes all directions of entry and points of entry, as well as all angles of entry at each entry point. Further details regarding one embodiment of an instrument suitable for such transapical access can be found in PCT Publication No. WO 2006/078694 to Speziali, which is hereby incorporated herein by reference in its entirety, although other transapical instruments may also be utilized with various embodiments as disclosed herein.

In other embodiments, the methods and apparatus described herein can be performed or configured for edge to edge leaflet repair via an endovascular approach, such as a transfemoral, transseptal approach. Further details regarding one embodiment of an instrument suitable for such an endovascular access approach can be found in U.S. Patent Publication No. 2016/014737, U.S. Patent Publication No. 2019/0290260 and U.S. Patent Publication No. 2020/0093478, each of which is hereby incorporated by reference in its entirety, although other transapical instruments may also be utilized with various embodiments as disclosed herein.

Figure 14:
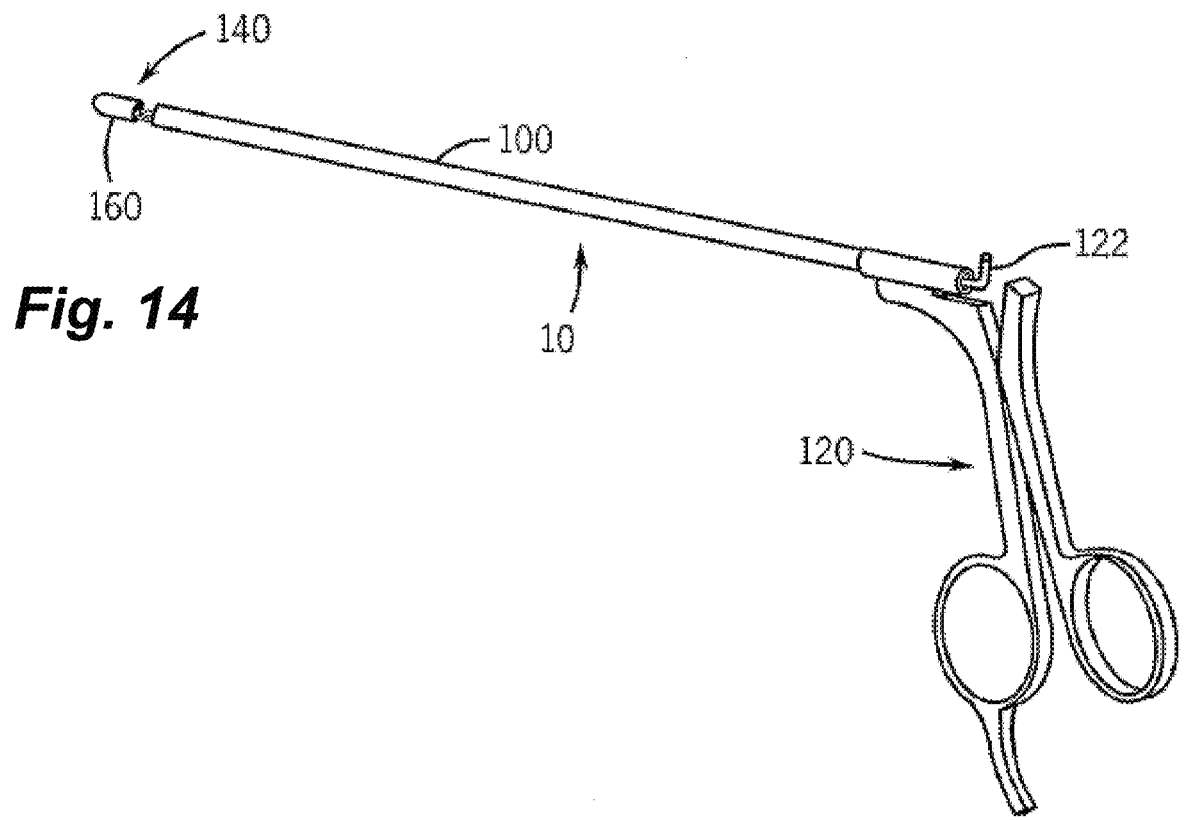
FIG. 14 is an isometric view of an instrument that can be employed with some embodiments of the disclosure.
Figure 15:
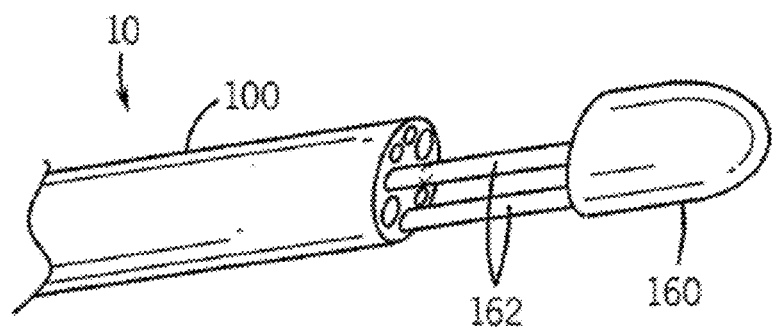
FIG. 15 is a detailed isometric view of the distal end of the instrument of FIG. 14.

One embodiment of an instrument 10 that can be used in performing the methods described herein is depicted in FIGS. 14 and 15. Instrument 10 includes a rigid metal shaft 100 having a handle 120 at its extrathoracic (proximal) end that enables the instrument to be manipulated and guided into position. Actuating mechanisms for controlling the grasping mechanism and needle mechanism located at the distal end 140 of the instrument are also mounted near the handle 120. The grasping mechanism is operated by squeezing the scissor-grip handle 120, and the needle mechanism is operated by moving an up-turned control shaft 122.

Figure 16A:
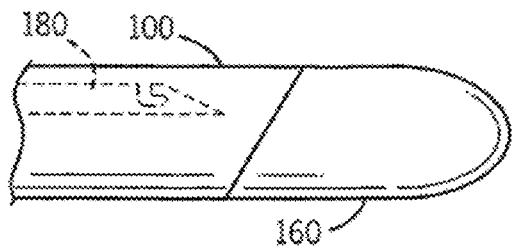
FIG. 16A is a detailed side elevation view of the distal end of the instrument of FIG. 14 showing the tip in a closed position.
Figure 16B:
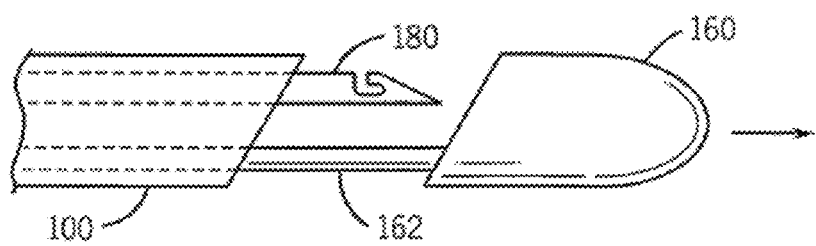
FIG. 16B is a detailed side elevation view of the distal end of the instrument of FIG. 14 showing rods inside the instrument that are capable of sliding to move the tip to an open position.
Figure 17:
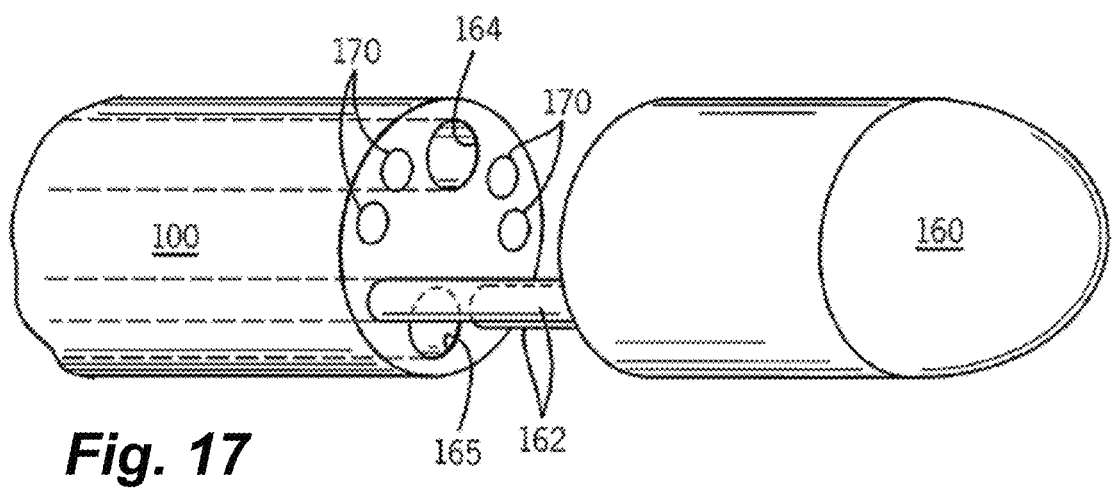
FIG. 17 is a detailed isometric view of the distal end of the instrument of FIG. 14 showing the needle lumen and four fiberoptic channels that are disposed around the needle lumen.

Located on the distal, intracardiac end 140 of the instrument 10 is a grasping mechanism which can be operated to hold a valve leaflet. As shown in FIGS. 15, 16A, 16B, and 17, in one embodiment this mechanism is a tip 160 which is supported on the distal end of the shaft 100 by a set of rods 162. The rods 162 slide within the shaft 100 to move the tip 160 between an open position as shown in FIGS. 16B and 17 and a closed position as shown in FIG. 16A when the scissor-grip handle 120 is operated. As will be explained below, a valve leaflet is located in the gap between the open tip 160 and the distal end of shaft 100 and it is captured by closing the tip 160 to pinch the valve leaflet therebetween.

Disposed in a needle lumen 164 formed in the shaft 100 is a needle 180 which connects to the control shaft 122 at the proximal end of shaft 100. Needle mechanism 180 slides between a retracted position in which it is housed in the lumen 164 near the distal end of the shaft 100 and an extended position in which it extends into the sliding tip 160 when the tip is in its closed position. As a result, if a valve leaflet has been captured between the tip 160 and the distal end of shaft 100 the needle may be extended from the lumen 164 by moving control shaft 122 to puncture the captured leaflet and pass completely through it.

The distal end of the shaft 100 can also contain an artificial chorda, or suture 18 that is to be deployed in the patient's heart. The suture 18 is typically a 4-0 or 5-0 suture manufactured by a company such as Gore-Tex. This suture 18 is deployed by the operation of the grasping mechanism and the needle mechanism 180 as described in more detail below. Further details regarding example embodiments of such devices can be found in U.S. Pat. Nos. 8,465,500; 8,758,393; and 9,192,374, each of which is hereby incorporated by reference herein in its entirety.

Figure 18A:
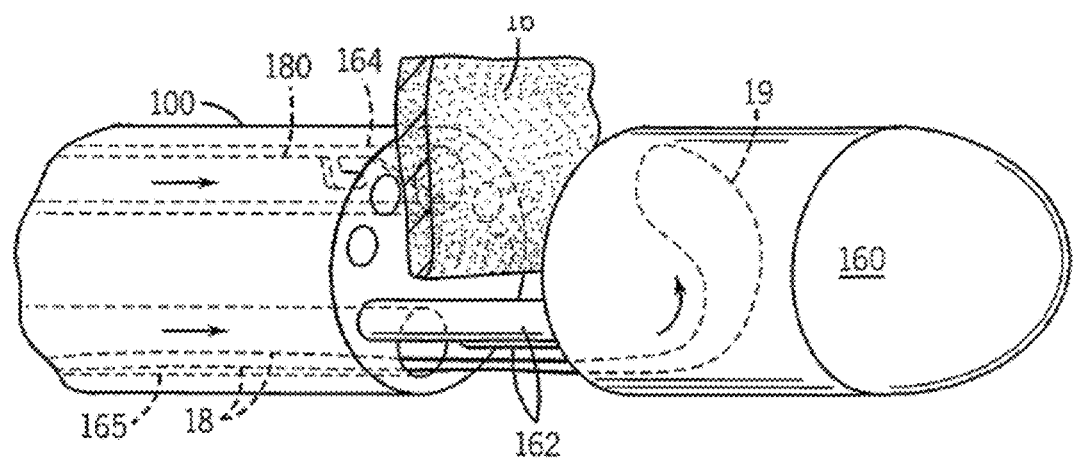
Figure 18B:
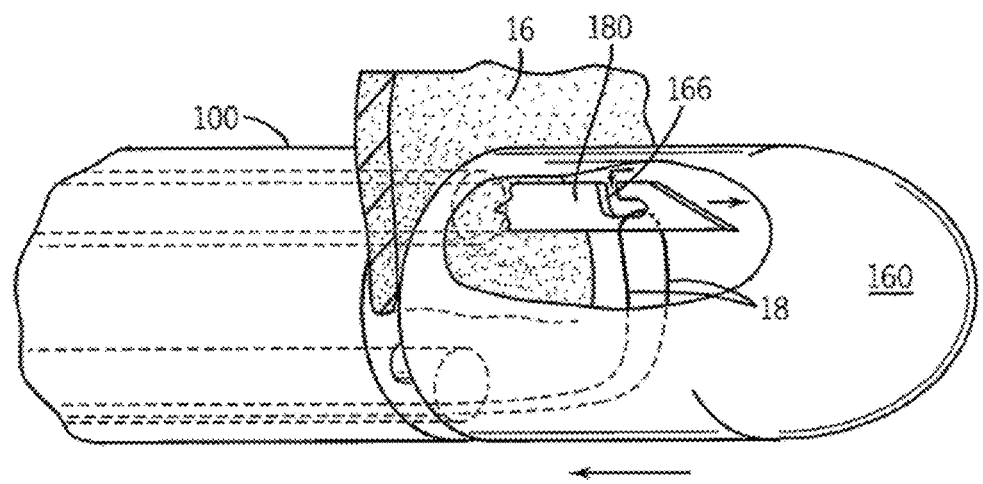
Figure 18C:
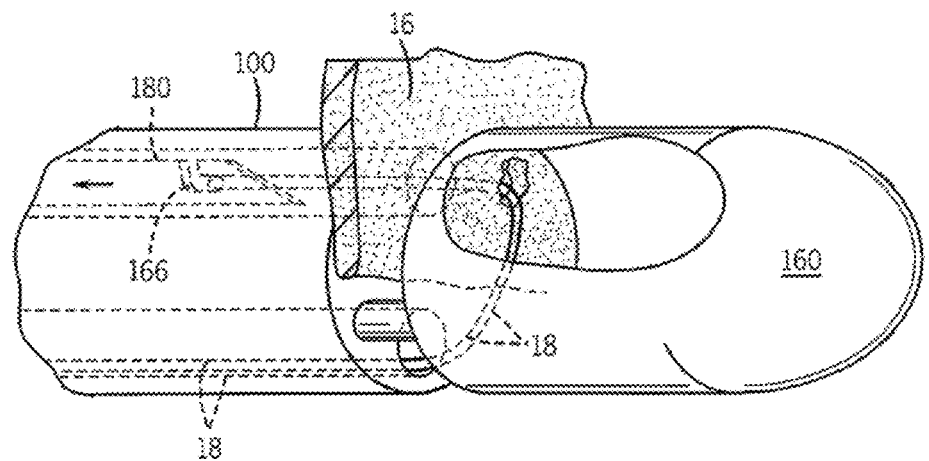
Figure 18D:
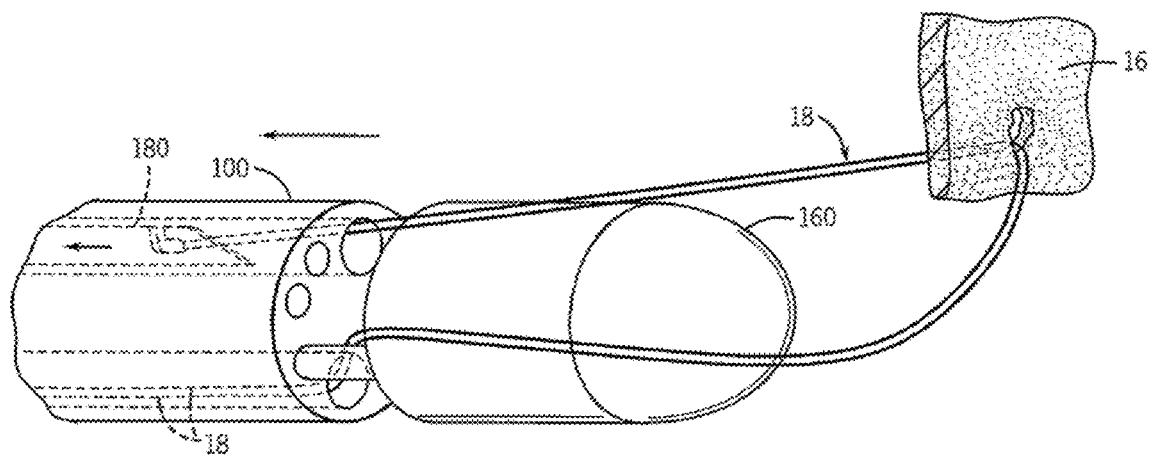
Figure 18E:
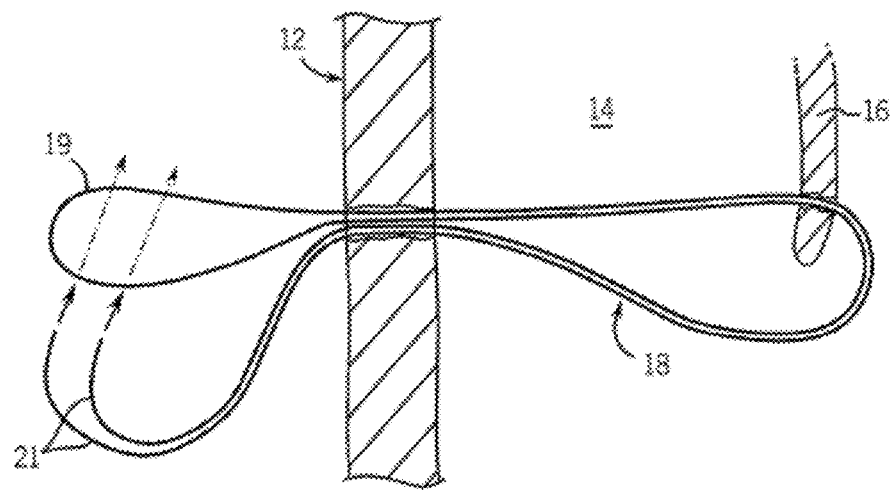
Figure 18F:
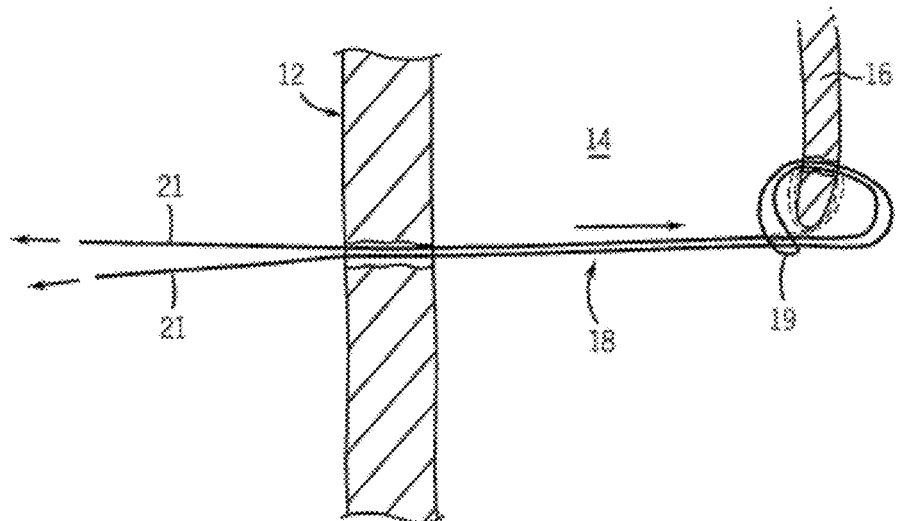

As shown in FIGS. 18A-18F, a suture can be deployed into a heart valve leaflet of a beating heat of a patient with instrument 10 and other similar instruments described herein. Instrument 10 is positioned around a valve leaflet 16 to be repaired as shown in FIG. 18A. In one embodiment, the suture 18 can be folded at the middle to form a loop 19 that is positioned in the tip 160. Both ends of the suture 18 can be disposed in a suture lumen 165 formed in the shaft 100 beneath the rods 162. As shown in FIG. 18B, the valve leaflet 16 is grasped by closing the tip 160, and the needle 180 is extended to puncture the leaflet 16 and extend into the tip 160. A notch 166 formed on one side of the needle 180 hooks the suture loop 19. The needle 180 is then retracted back through the leaflet 16 to pull the suture loop 19 through the puncture opening as shown in FIG. 18C. The leaflet 16 is then released and the instrument 10 is withdrawn from the heart as shown in FIG. 18D pulling both ends and the midpoint of the suture 18 with it. As shown in FIG. 18E, the suture 18 is released by the instrument 10 and the surgeon inserts the two suture ends 21 through the loop 19 at its midpoint. The ends 21 are then pulled and the loop 19 slides along the suture 18 back into the heart chamber 14 where it forms a Larks head around the edge of the valve leaflet as shown in FIG. 18F. At this point, the two free ends 21 of the suture 18 are external to the heart wall at the apex 12 of the heart. Multiple sutures 18 may be implanted in this manner.

Figure 1C:
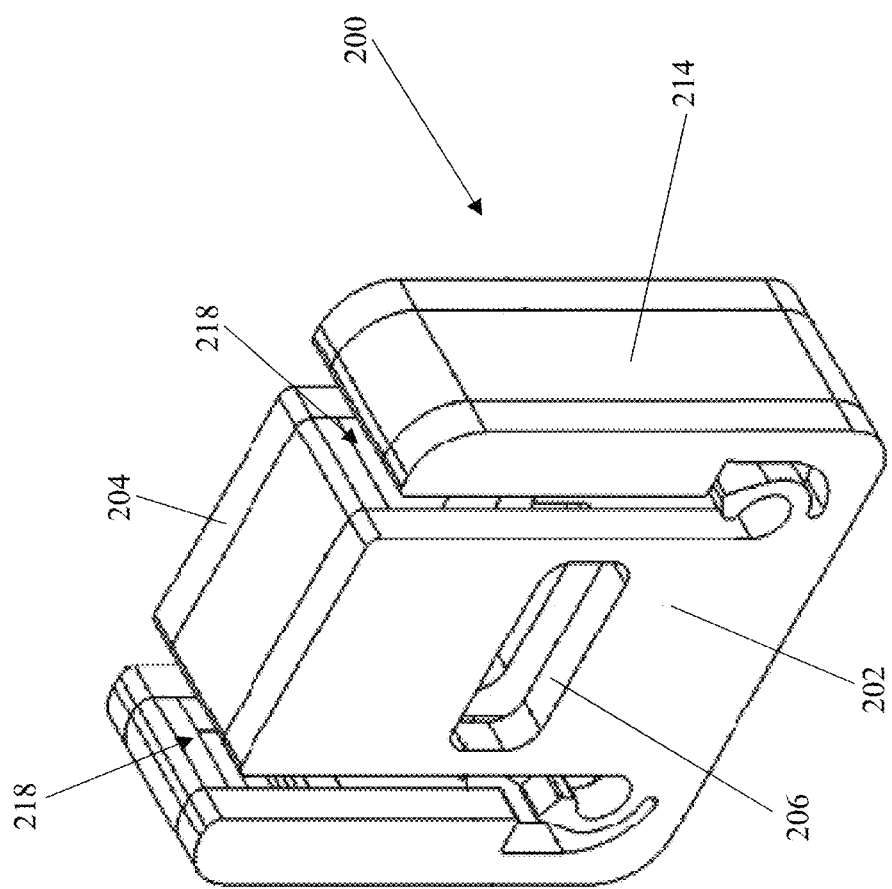
FIG. 1C is an isometric view of the suture crimp of FIGS. 1A-1B.

FIGS. 1A-1C depict a suture crimp 200 for crimping one or more sutures in the heart according to an embodiment. The sutures can be inserted using one or more of the devices and methods described above, e.g., transcatheter, transapically, etc. or with any other known devices and methods. In the depicted embodiment, the two free ends 21 of two sutures are depicted extending through the suture crimp, but it should be understood that greater or fewer sutures could be crimped with suture crimp. In one embodiment, a first suture is inserted through a first leaflet, a second suture is inserted through a second leaflet, and the suture crimp is employed to crimp the sutures at an appropriate tension to hold the leaflets in coaptation for an edge to edge repair of, e.g., the mitral valve.

Suture crimp 200 can include a crimp body including a front plate 202 and a back plate 204 each with a corresponding loading aperture 206, 208 through which the one or more sutures can be inserted and a pair of slots 210, 212. In embodiments, the sutures can be inserted through the loading apertures 206, 208 outside of the body and the suture crimp 200 advanced along the sutures to the leaflet(s) into which the sutures have previously been inserted. Suture crimp 200 can further include a spacer plate 214 to which the front plate and back plate are welded or otherwise connected to establish crimp body with a desired width between plates. As can be seen most clearly in FIG. 1C, spacer plate 214 can be thicker than front plate 202 and back plate 204 but otherwise have a generally matching shape, including a pair of slots 218 that align with the slots 210, 212 in the front and back plates 202, 204 to define actuation slots described below. As will be described in more detail below, a movable suture clamping gate 216 can be disposed within suture crimp between front 202 plate and back plate 204. In embodiments, suture crimp 200 can be laser cut from a stainless steel sheet.

Figure 2B:
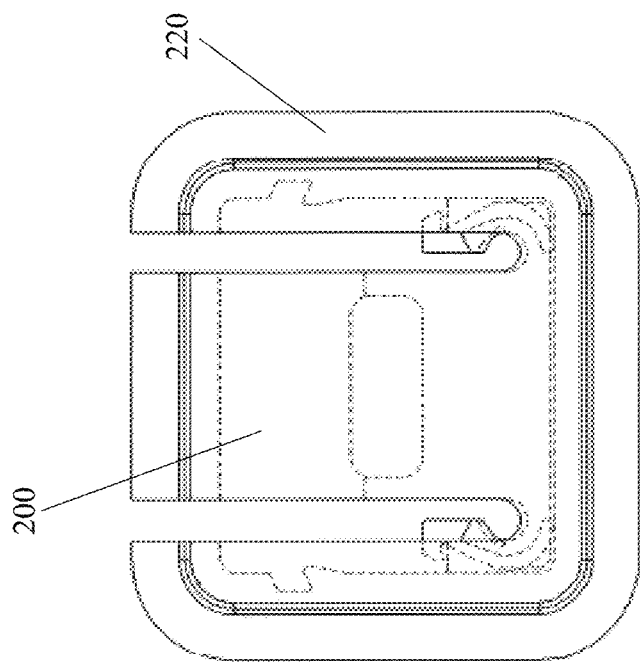
FIG. 2B is a plan view of the suture crimp and covering of FIG. 2A.
Figure 2A:
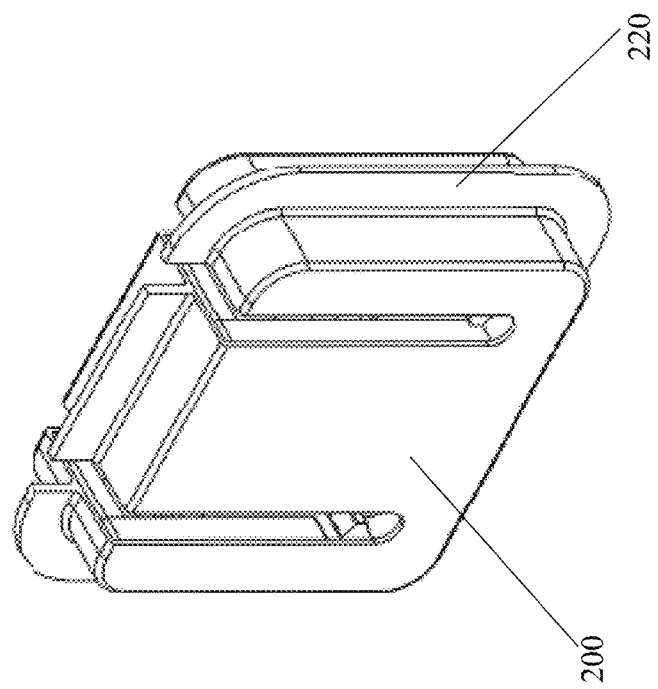
FIG. 2A is an isometric view of a suture crimp with a covering according to an embodiment.

In some embodiments, suture crimp 200 can include an anti-thrombotic cover 220 depicted in FIGS. 2A-2B. Cover 220 can be formed from a variety of material including, for example a woven or knitted polyester material such as Dacron, an electrospun polymer, etc. In embodiments, cover 200 can be thermally sealed around the edge of the suture crimp 200 or otherwise adhered to the metal material of the crimp 200 as shown in the figures. Cover 220 may be employed to resist clotting or thrombosis on the suture crimp 200 and/or to enhance tissue integration around the suture crimp.

FIG. 3A depicts how sutures 18 can be inserted straight through the loading apertures 206, 208 of the suture crimp 200. Suture clamping gate 216, which also includes a loading aperture through which sutures can be inserted, can be spaced between front plate 202 and back plate 204 to define a pair of suture compression gaps 222 on each side of suture clamping gate 216. As will be described in more detail below, when the suture clamping gate 216 is moved from the open position to the closed position within suture crimp 200 as depicted in FIG. 3B, the suture 18 is clamped within the suture crimp 200 across a tortuous path in the compression gap 222 between front plate 202 and suture clamping gate 216, around suture clamping gate 216 and between the compression gap 222 between the suture clamping gate 216 and the back plate 204. In embodiments, the suture compression gaps 222 have a smaller width than a diameter of the suture 18 in order to compress the suture to aid in suture clamping and retention.

Figure 4B:
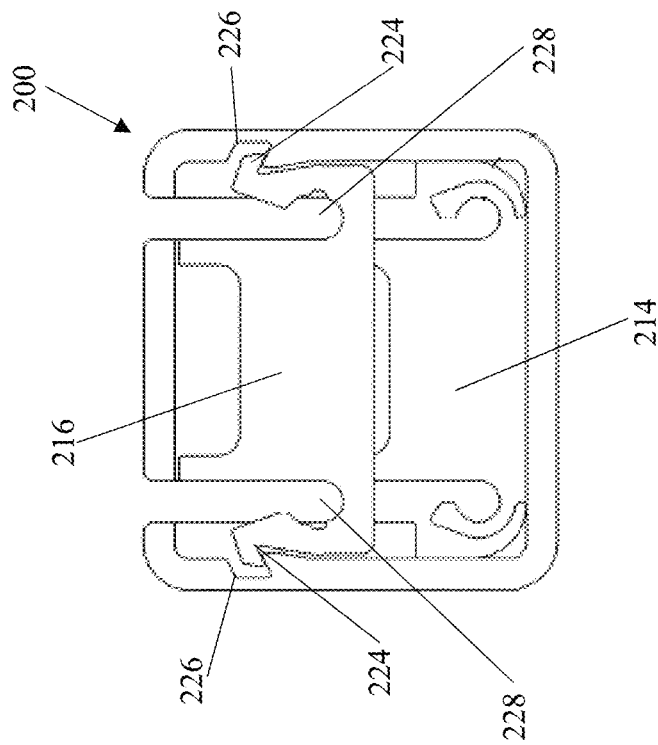
FIG. 4B is a plan view of the suture crimp of FIG. 4B shown without a top plate in a closed position.
Figure 4A:
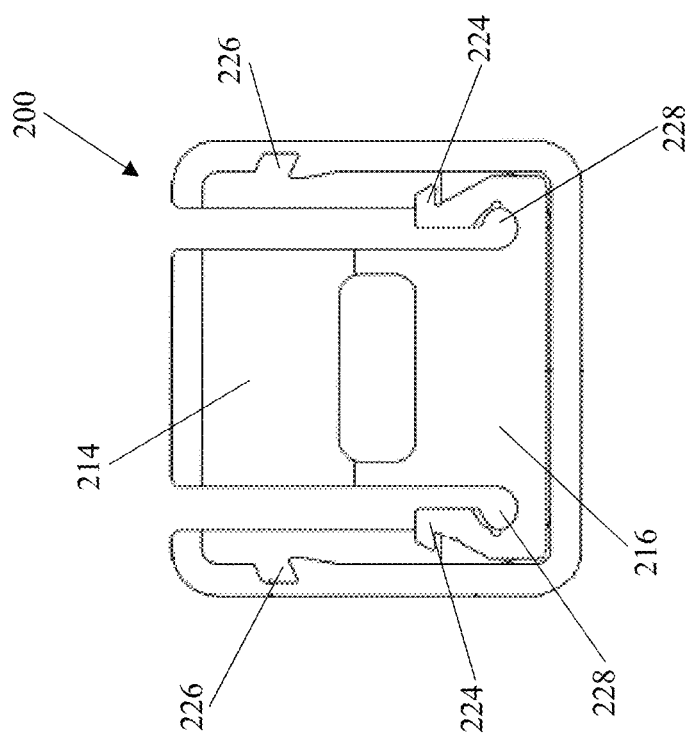
FIG. 4A is a plan view of a suture crimp shown without a top plate in an open position according to an embodiment.

FIGS. 4A-4B depict suture crimp 200 with front plate removed for sake of clarity in order to illustrate the operation of suture clamping gate 216 within suture crimp. Suture clamping gate 216 includes a pair of locking tabs 224 and spacer plate 214 can include a corresponding pair of locking grooves 226. When suture clamping gate 216 is moved from the open position, the locking tabs 224 nest within the locking grooves 226 in spacer plate 214 to lock the suture clamping gate 216 in the closed position. Suture clamping gate 216 can further include a pair of lock tab actuator apertures 228.

Figure 6:
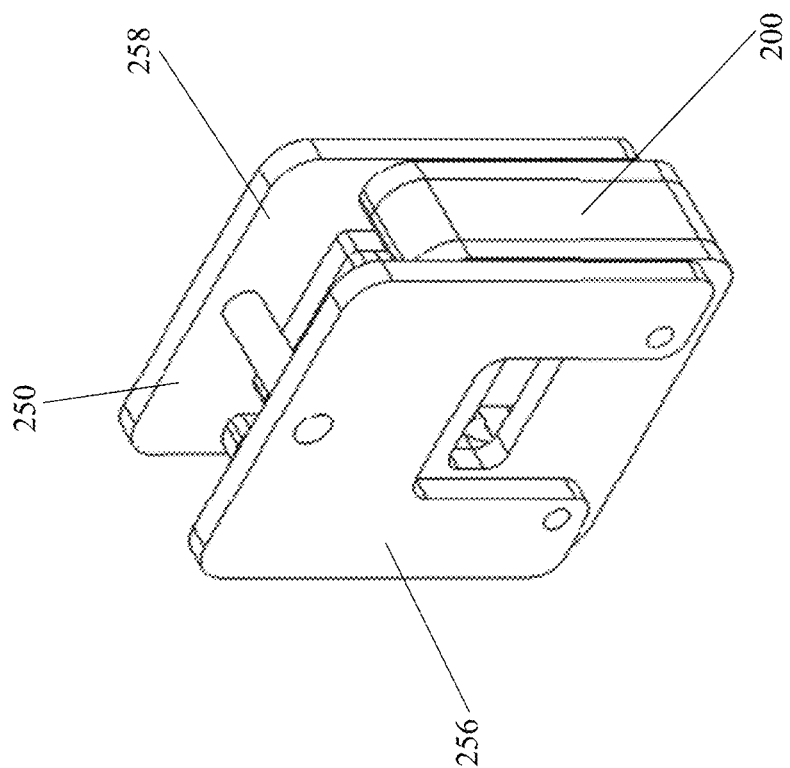
FIG. 6 is an isometric view of a suture crimp contained within a crimp holder according to an embodiment.

FIGS. 5A-5B depict a suture crimp holder 250 according to an embodiment. Suture crimp holder 250 can include a pull rod 252 and a pair of lock tab actuator rods 254 extending between a front plate 256 and a back plate 258. Referring now to FIG. 6, crimp holder 250 is sized to receive the suture crimp 200 between the front plate 256 and back plate 258 of the crimp holder 250. Lock tab actuators 254 of crimp holder 250 (see FIG. 5B) are initially inserted through actuation slots defined by slots 210, 212 in front plate 202 and back plate 204 and into lock tab actuator apertures 228 of suture crimp 200 (See FIG. 4B) to interface crimp holder 250 with suture crimp 200 in the open position as depicted in FIG. 7A. The suture clamping gate 216 is moved to the closed position by further moving the crimp holder 250 attached to the suture clamping gate 216 to pull the suture clamping gate 216 within the suture crimp 200. When the suture locking tabs 224 reach the locking grooves 226, the suture locking tabs 224 lock the suture locking gate 216 in the closed position clamping the suture. In an embodiment, suture locking gate 216 slides freely within suture crimp 200 until suture locking tabs 224 are disposed adjacent grooves 226, and then an additional amount of force can cause suture locking tabs 224 to deflect and move passed grooves 226 and then deflect back to nest in grooves 226. In some embodiments, crimp holder causes tabs to plastically deform into grooves. The crimp holder 250 can then slide back out of the slots 210, 212 of the suture crimp 200 to disengage the crimp holder 250 leaving the suture clamping gate 216 in the closed position.

Figure 8:
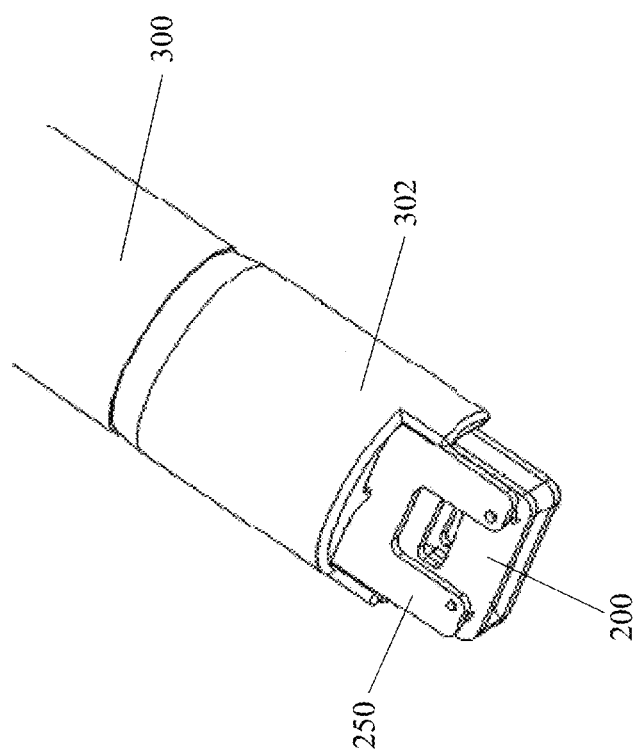
FIG. 8 depicts a suture crimp and crimp holder positioned in the distal tip of a delivery catheter according to an embodiment.
Figure 9B:
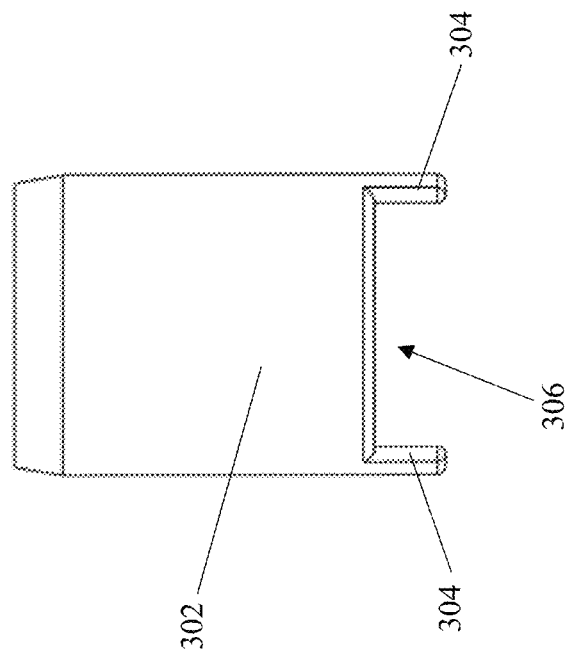
FIGS. 9A and 9B depict a catheter tip of the delivery catheter of FIG. 8.
Figure 9A:
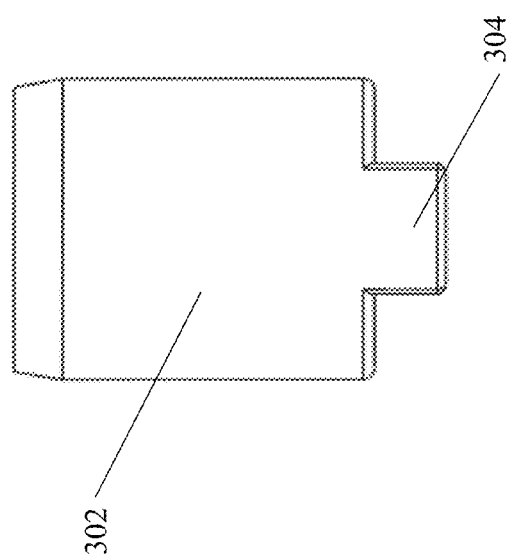
Figure 10:
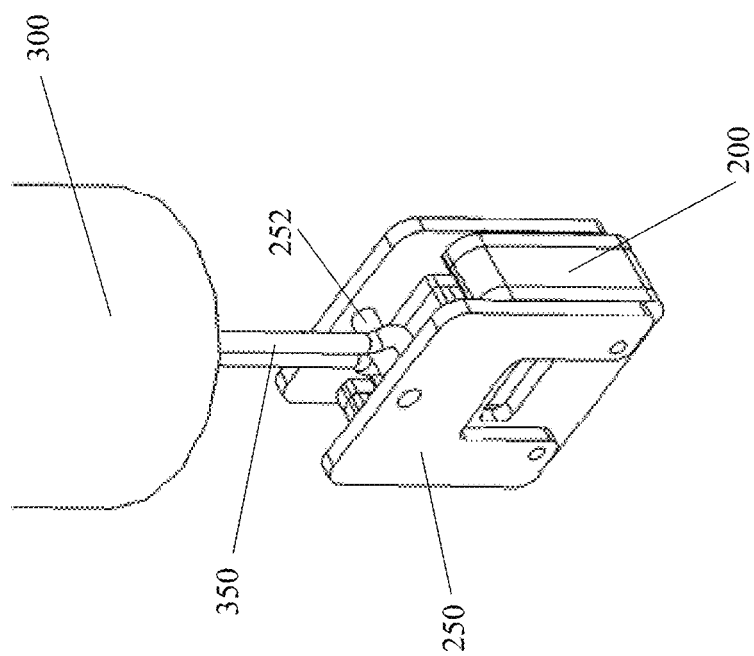
FIG. 10 depicts the suture crimp and crimp holder positioned in the delivery catheter of FIG. 8 with the catheter tip removed.
Figure 11:
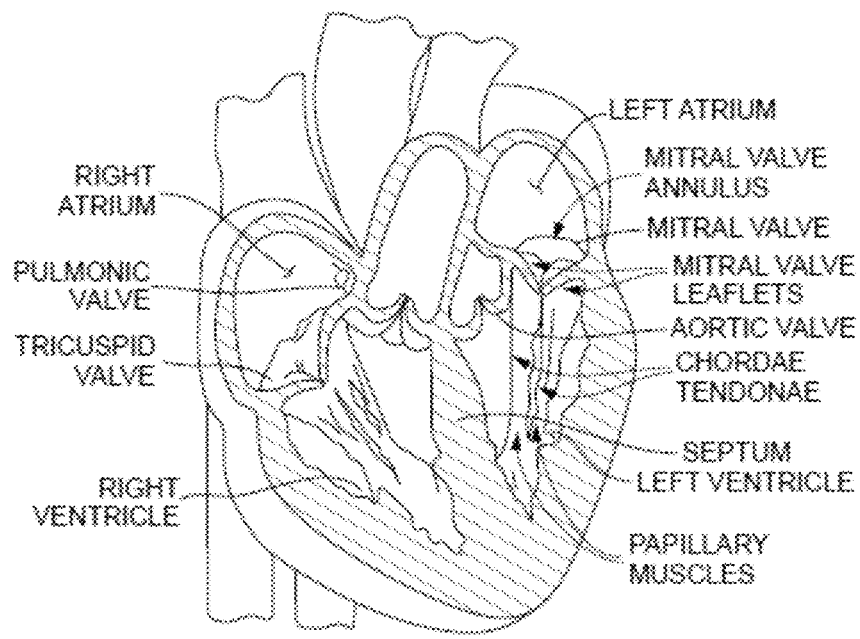
FIG. 11 is a schematic cross-sectional view of a heart.
Figure 12:
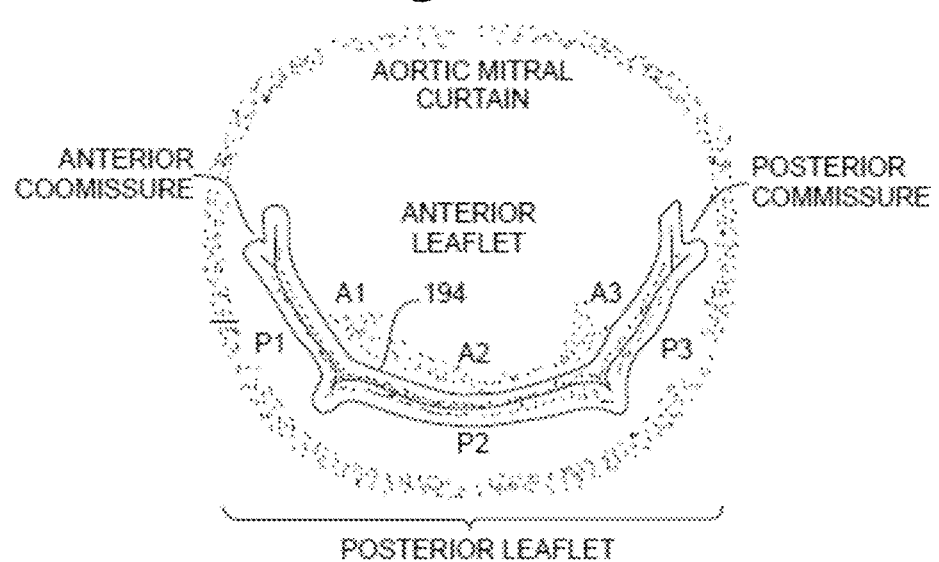
FIG. 12 is a schematic top plan view of a mitral valve.

FIGS. 8-10 depict the interaction of a delivery catheter 300 than can be used to deliver and actuate a suture crimp 200 according to an embodiment. The distal tip 302 of delivery catheter 300 is sized to hold crimp holder 250 and suture crimp 200. In one embodiment, distal tip 302 includes crimp holder ends 304 that define an opening 306 sized to hold suture crimp 200 and crimp holder 250. As can be seen in FIG. 10 (shown without distal tip for sake of clarity), an actuation wire 350 extends through delivery catheter 300 and is looped around the pull rod 252 of crimp holder 250. The crimp holder 250 can therefore be actuated to move the suture clamping gate 216 from the open position to the closed position as described above by pulling proximally on the actuation wire 350 from outside of the body. Once the suture clamping gate 216 is locked in the closed position the actuation wire 350 can pull the lock tab actuators 254 out of the slots 228 in the suture crimp 200 to remove the crimp holder 250 from the suture crimp 200, leaving the suture crimp 200 in place on the leaflet. Any remaining suture on the opposite side of the crimp from the attached tissue can then be cut and removed. In embodiments, the delivery catheter is a separate device used to deliver the suture crimp and is not the same device as is used to insert the sutures.

Figure 20:
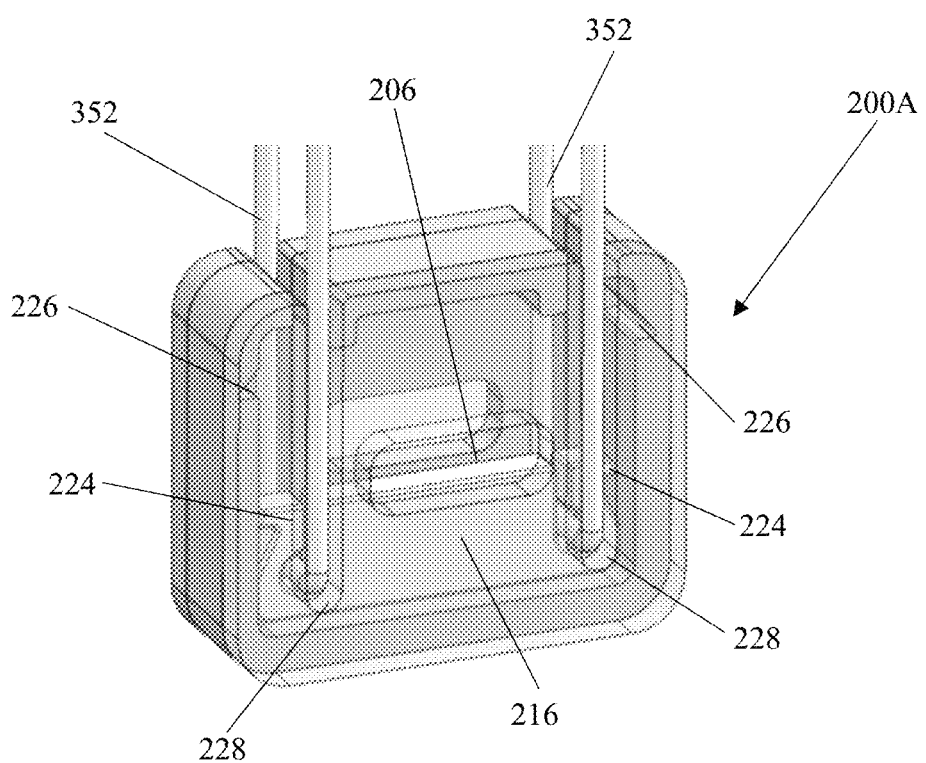
FIG. 20 depicts a suture crimp according to an embodiment.
Figure 21B:
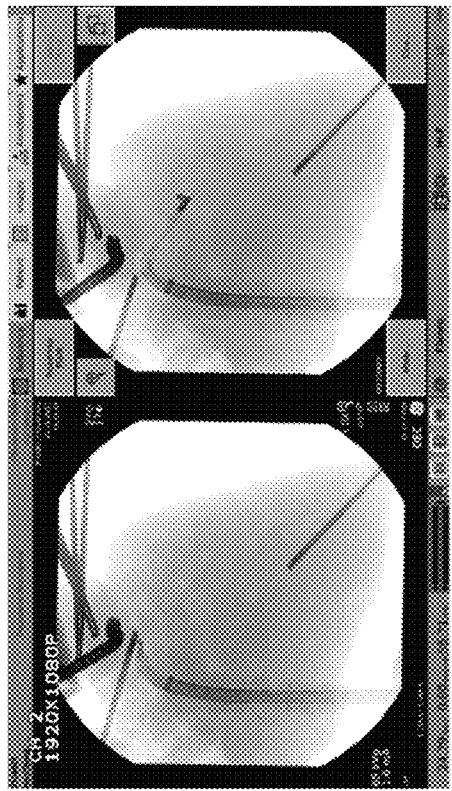
FIGS. 21A-21D are endoscopic images depicting sutures inserted into leaflets as described herein.
Figure 21D:
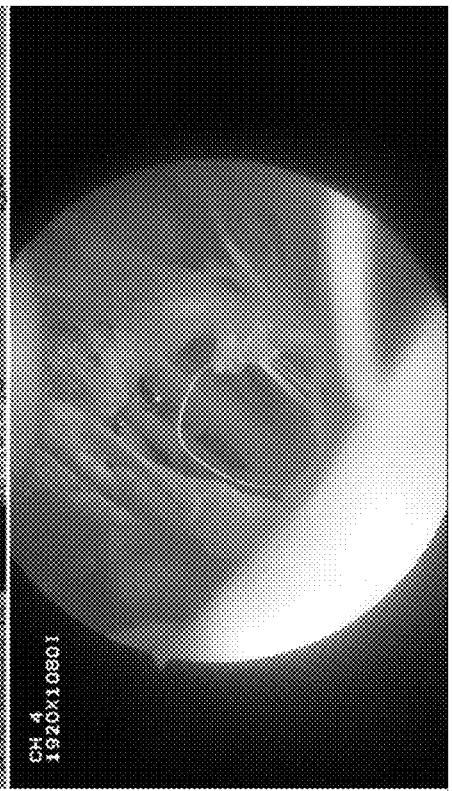
Figure 21A:
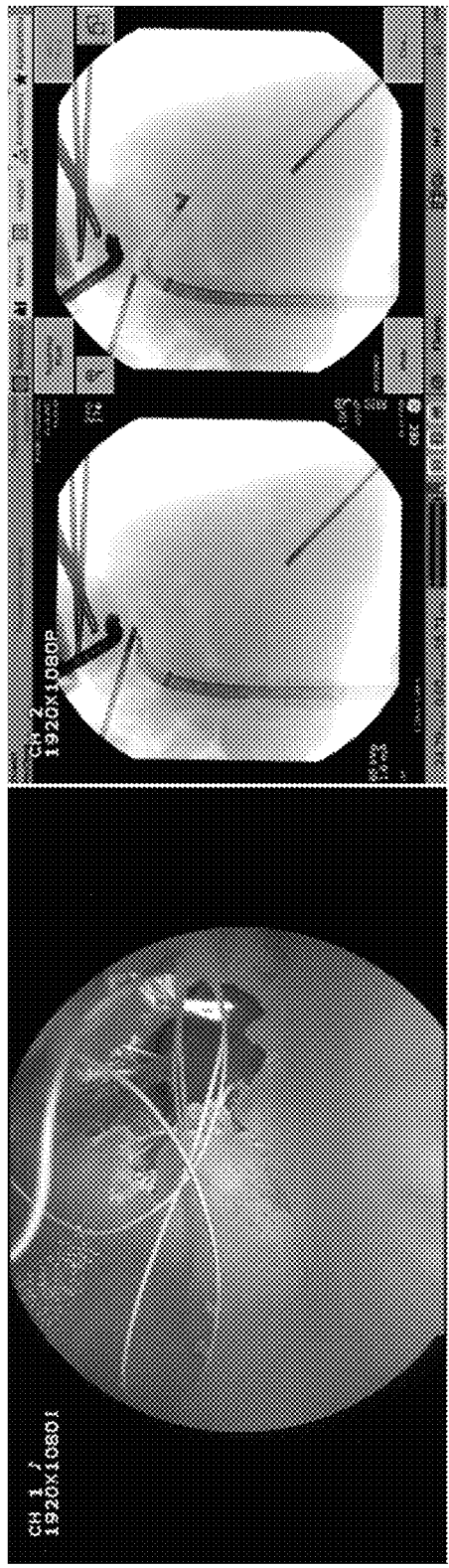
Figure 21C:
Figure 23B:
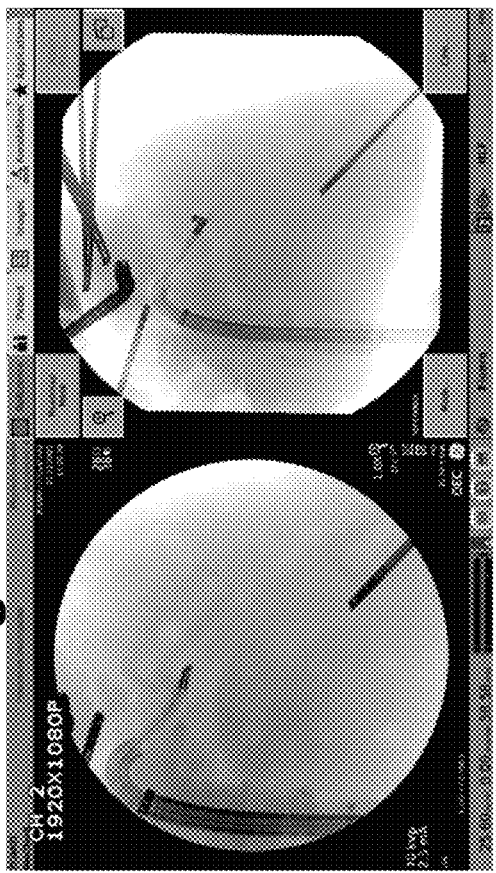
FIGS. 23A-23D are endoscopic images depicting the suture crimp of FIGS. 22A-22D after actuation.
Figure 23D:
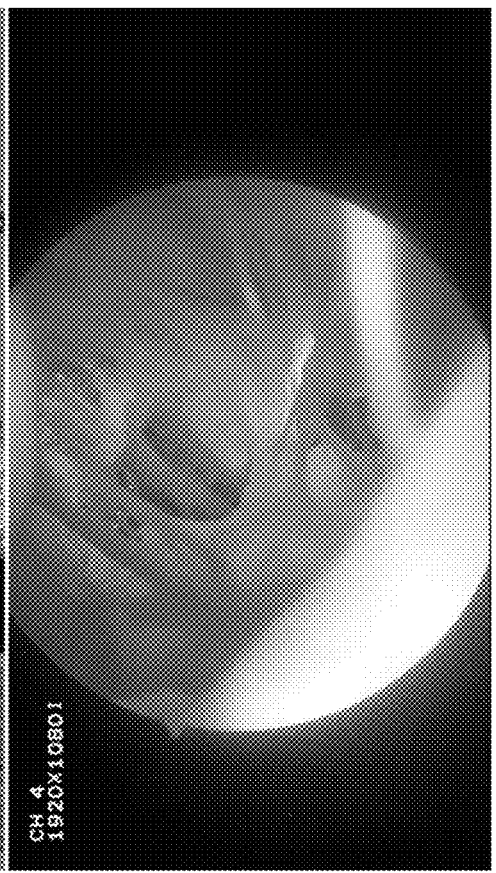
Figure 23A:
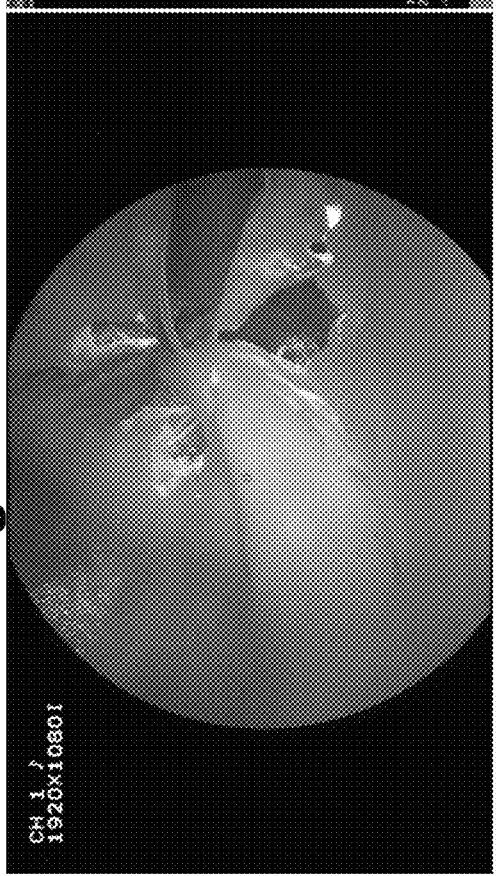
Figure 23C:
Figure 24B:
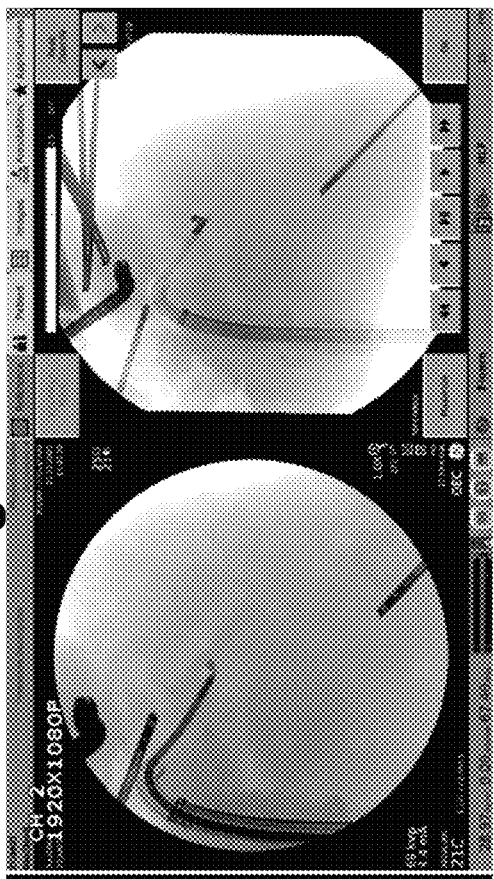
FIGS. 24A-24D are endoscopic images depicted the suture crimp of FIGS. 23A-23D on the leaflets after the excess suture has been cut.
Figure 24D:
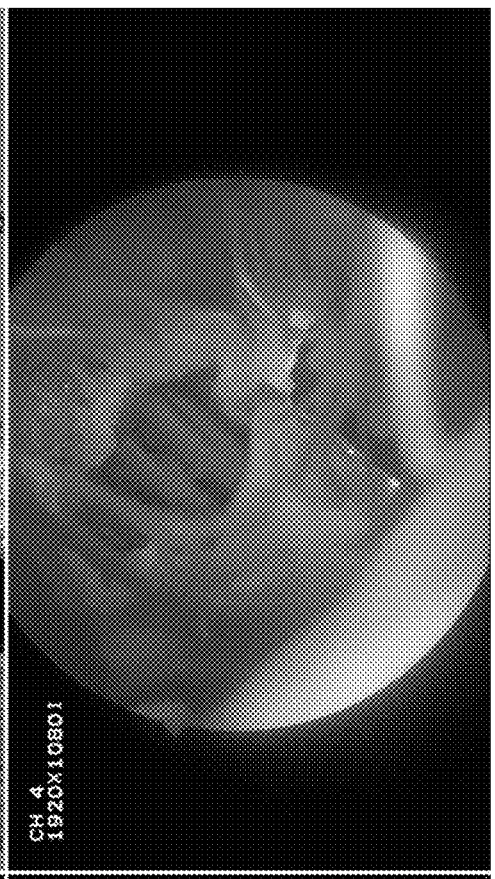
Figure 24A:
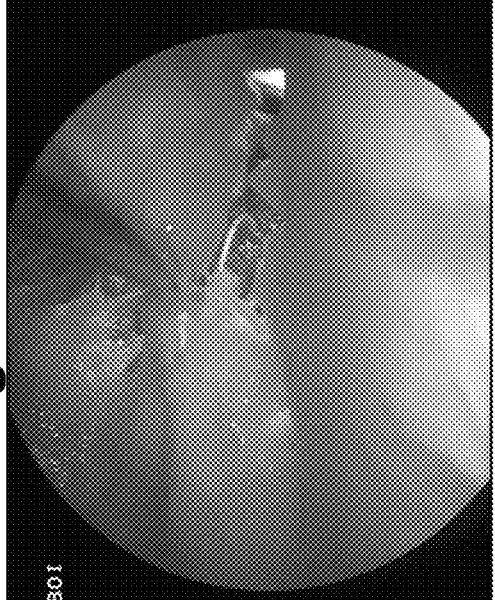
Figure 24C:
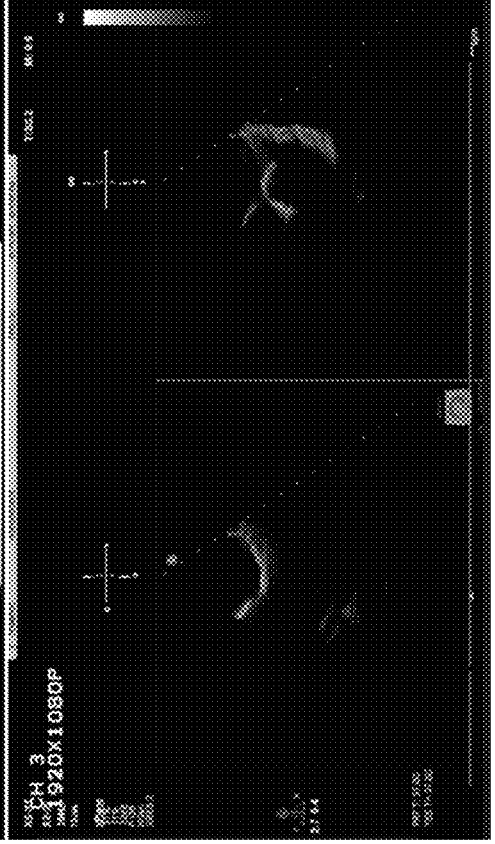

FIG. 20 depicts a suture crimp 200A according to another embodiment. Crimp 200A is substantially similar to suture crimp 200. However, in this embodiment suture crimp 200A is configured to be delivered into the heart and actuated without use of crimp holder 250. Instead, suture crimp 200 is actuated with a pair of actuation wires 352. Each actuation wire 352 can extend through a delivery catheter and the actuation slots in crimp to be positioned within one of the actuation slots 228 of the suture clamping gate 216 such that pulling on the wires from outside the body will actuate the suture clamping gate 216 to crimp sutures extending through suture apertures 206. Once the suture clamping gate has been pulled all the way upwardly, the force of the actuation wires on the suture locking tabs 224 can help the tabs to plastically deform and nest into the locking grooves 226. Further force on the actuation wires 352 can remove the wires from the suture crimp 200 leaving the crimp locked on the sutures. In another embodiment, the pair of actuation wires 352 are not extended through the delivery catheter, but are instead operably interfaced proximal to the suture crimp 200 with a single actuation wire 350 similar to that shown in FIG. 10 that extends through the catheter. In other similar embodiments, the pair of actuation wires 352 are interfaced with a single set of actuation wires in place of a single actuation wire 350.

Figure 19A:
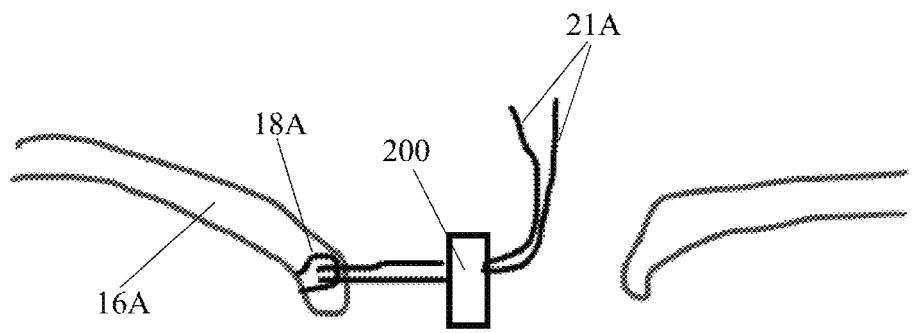
FIGS. 19A-19C schematically depict a procedure for inserted a suture crimp for an edge to edge heart valve repair according to an embodiment.
Figure 19B:
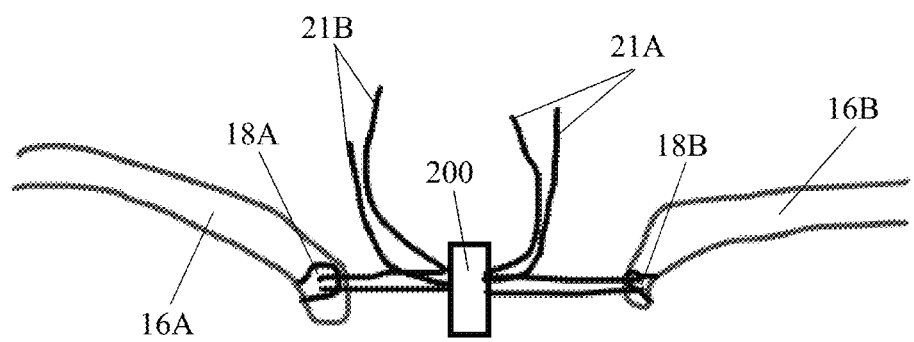
Figure 19C:
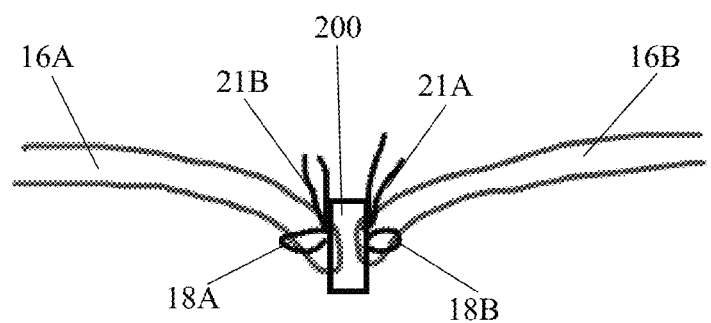

FIGS. 19A-19C schematically depict insertion of a suture crimp such as suture crimp 200 or 200A into the body. First 18A and second 18B sutures are inserted through first 16A and second 16B leaflets and the free ends 21A, 21B of each suture 18A, 18B are inserted through the crimp 200. Once the sutures 18A, 18B have been adjusted to a tension that achieves desired leaflet 16A, 16B function, the crimp 200 is actuated in one of the manners set forth above to clamp the sutures at the desired tension. The suture ends 21A, 21B of each suture 18A, 18B can then be severed adjacent the crimp 200 with an appropriate cutting tool with the crimp 200 remaining in the body locked to the leaflets 16A, 16B by the sutures 18A, 18B to correct valve function. Applicant has conducted studies utilizing an embodiment of a crimp suture as described herein. As shown in the sequence of endoscopic images presented in FIGS. 21A-21D and 25A-25D, it will be apparent to a person skilled in the art that use of such crimps in the manner described herein to repair valve function can provide a significant reduction in mitral valve regurgitation.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A suture crimp configured to crimp one or more sutures attached to a heart valve leaflet in a beating heart of a patient, comprising:
    a crimp body having an open interior and a pair of locking grooves, the crimp body including a loading aperture through the crimp body configured to enable one or more sutures to pass through the crimp body; and
    a suture clamping gate movable within the open interior of the crimp body and having a pair of locking tabs corresponding to the locking groove,
    wherein the suture clamping gate is configured to move proximally with respect to the crimp body to move the suture clamping gate from an open position in which the one or more sutures can slide freely through the loading aperture and a closed position in which the locking tabs of the suture clamping gate interface with the locking grooves in the crimp body to lock the suture clamping gate in the closed position to securely hold one or more tensioned sutures between the suture clamping gate and the crimp body, wherein each locking tab of the suture clamping gate defines a locking tab aperture configured to interface with a gate actuator configured to move the suture clamping gate within the crimp body, and
    wherein the crimp body includes a pair of slots, each slot extending from a proximal end of the crimp body to one of the locking tab apertures.

2. The suture crimp of claim 1, wherein the gate actuator comprises a first actuation wire configured to interface with a first of the locking tab apertures and second actuation wire configured to interface with a second of the locking tab apertures.

3. The suture crimp of claim 1, wherein the gate actuator comprises a crimp holder having a first actuation rod configured to interface with a first of the locking tab apertures and second actuation rod configured to interface with a second of the locking tab apertures.

4. The suture crimp of 1, wherein the locking tabs are configured to plastically deform into the locking grooves to lock the suture clamping gate with respect to the crimp body.

5. The suture crimp of claim 1, wherein the crimp body includes an anti-thrombotic cover.

6. The suture crimp of claim 1, wherein when the suture clamping gate is in the closed position the one or more sutures define a tortuous path through the crimp body.

7. The suture crimp of claim 6, wherein the tortuous path includes the one or more sutures extending through the loading aperture on a first side of the crimp body, along a first suture compression gap between the crimp body and the suture clamping gate, around the suture clamping gate, along a second suture compression gap between the crimp body and the suture clamping gate and out the loading aperture on a second side of the crimp body.

8. A suture crimping system configured to crimp one or more sutures attached to a heart valve leaflet in a beating heart of a patient, comprising:
    a suture crimp including a crimp body having an open interior and a pair of locking grooves and a suture clamping gate movable within the crimp body and having a pair of locking tabs corresponding to the locking grooves, the suture crimp further defining a loading aperture through the crimp body configured to enable one or more sutures to pass through the crimp body;
    a crimp holder having a first plate and a second plate defining a suture crimp space therebetween configured to releasably contain the suture crimp, the crimp holder further comprising a pull rod extending between the first plate and the second plate and a pair of lock tab actuator rods extending between the first plate and the second plate configured to interface with corresponding lock tab actuator apertures in the suture clamping gate of the suture crimp to enable the crimp holder to move the suture clamping gate,
    wherein a force applied proximally on the pull rod of the crimp holder causes the crimp holder and the suture clamping gate to move proximally with respect to the crimp body to move the suture clamping gate from an open position in which the one or more sutures can slide freely through the loading aperture and a closed position in which the locking tabs of the suture clamping gate interface with the locking grooves in the crimp body to lock the suture clamping gate in the closed position to securely hold one or more tensioned sutures between the suture clamping gate and the crimp body.

9. The suture crimping system of claim 8, wherein the crimp body includes a pair of slots, each slot extending from a proximal end of the crimp body to one of the lock tab apertures to enable the lock tab actuator rods of the crimp holder to extend through the crimp body to the lock tab actuators of the suture clamping gate.

10. The suture crimp of 10, wherein the locking tabs are configured to plastically deform into the locking grooves to lock the suture clamping gate with respect to the crimp body.

11. The suture crimp of claim 8, wherein when the suture clamping gate is in the closed position the suture defines a tortuous path through the crimp body including the suture extending through the loading aperture on a first side of the crimp body, along a first suture compression gap between the crimp body and the suture clamping gate, around the suture clamping gate, along a second suture compression gap between the crimp body and the suture clamping gate and out the loading aperture on a second side of the crimp body.

* * * * *